(12) United States Patent
Takeda et al.

(10) Patent No.: US 7,243,530 B2
(45) Date of Patent: Jul. 17, 2007

(54) FREE FALL SENSOR

(75) Inventors: Teruyuki Takeda, Nagoya (JP); Biao Sun, Nagoya (JP)

(73) Assignee: Ubukata Industries Co., Ltd., Aichi (JP)

( * ) Notice: Subject to any disclaimer, the term of this patent is extended or adjusted under 35 U.S.C. 154(b) by 55 days.

(21) Appl. No.: 11/060,817

(22) Filed: Feb. 18, 2005

(65) Prior Publication Data

US 2005/0223784 A1 Oct. 13, 2005

(30) Foreign Application Priority Data

| Apr. 13, 2004 | (JP) | .............................. 2004-117806 |
| Nov. 16, 2004 | (JP) | .............................. 2004-331932 |
| Dec. 17, 2004 | (JP) | .............................. 2004-365849 |

(51) Int. Cl.
*G01M 1/10* (2006.01)

(52) U.S. Cl. .................................................... 73/65.01

(58) Field of Classification Search ................ 73/65.01
See application file for complete search history.

(56) References Cited

U.S. PATENT DOCUMENTS

| 3,073,922 | A | | 1/1963 | Miller | |
| 4,386,386 | A | * | 5/1983 | Akita | ........................ 361/283.1 |
| 5,315,996 | A | * | 5/1994 | Lundquist | ..................... 600/374 |
| 2001/0026163 | A1 | * | 10/2001 | Sasaki et al. | ................ 324/690 |
| 2002/0056622 | A1 | * | 5/2002 | Yamashita et al. | ........ 200/61.53 |

FOREIGN PATENT DOCUMENTS

| FR | 1258942 | 4/1961 |
| JP | 2000-195206 | 7/2000 |
| JP | 2000195206 | 7/2000 |
| JP | 2001-185012 | 7/2001 |
| JP | 2001185012 | 7/2001 |

\* cited by examiner

*Primary Examiner*—Max Noori
(74) *Attorney, Agent, or Firm*—Smith, Gambrell & Russell LLP

(57) ABSTRACT

A free fall sensor includes an electrically conductive container, an electrically conductive pin having an end inserted into the container, and a movable electrode enclosed in the container, the movable electrode including a coil spring cantilevered on the end of the conductive pin and a weight disposed in an inner space of the coil spring so as to be movable and so as to be prevented from falling off. The weight is a sphere having a smaller diameter than the coil spring.

13 Claims, 15 Drawing Sheets

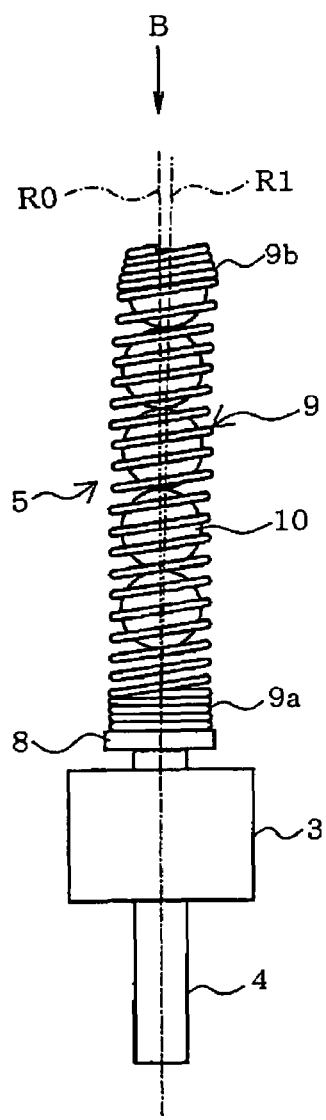 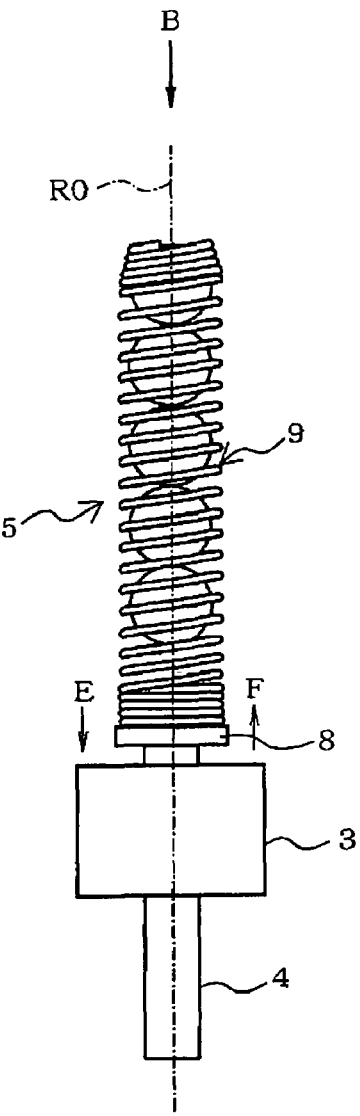
FIG.5A  FIG.5B
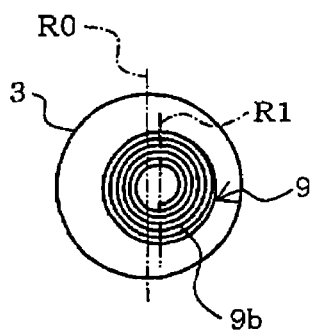 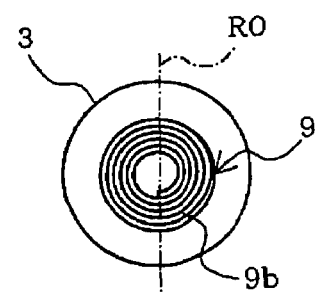
FIG.5C  FIG.5D

FIG.15A
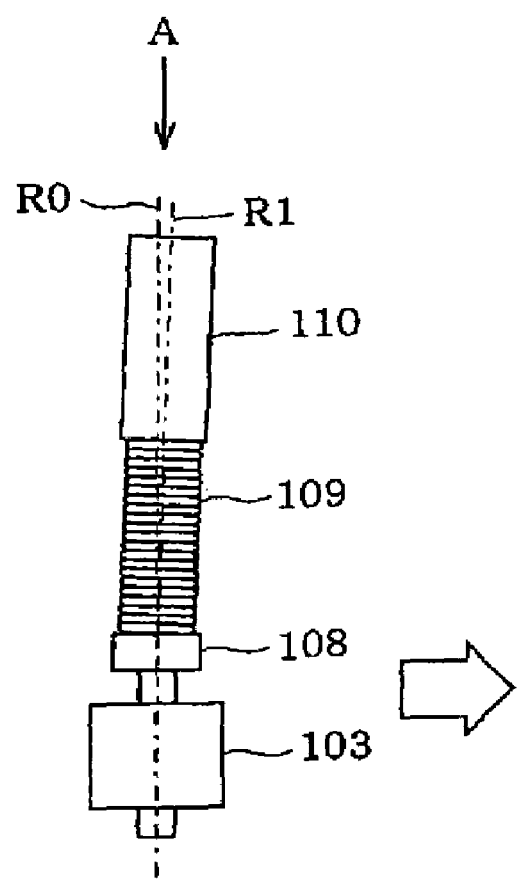
FIG.15B
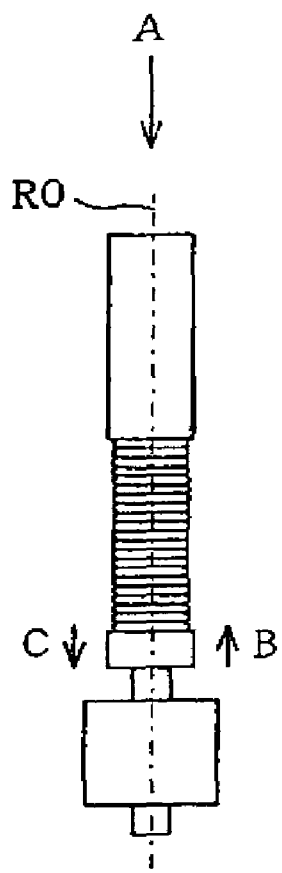
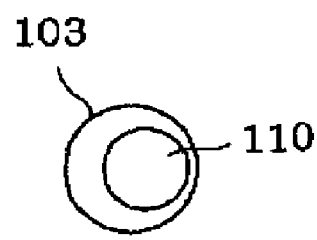
FIG.15C
FIG.15D

FREE FALL SENSOR

BACKGROUND OF THE INVENTION

1. Field of the Invention

This invention relates to a free fall sensor detecting a fall state.

2. Description of the Related Art

A free fall sensor has conventionally been incorporated in appliances such as portable computers to detect a fall state, thereby protecting hard disks built in the appliances against damage caused by shock due to the falling. Measures are taken on the basis of a detection signal generated by the free fall sensor. For example, a magnetic head of the hard disk is moved to an evacuation position.

The free fall sensors are required to be miniaturized in order to be built into appliances. JP-A-2000-195206 (hereinafter, "document 1") discloses one example of the foregoing free fall sensors. The free fall sensor disclosed in document 1 comprises a cylindrical electrically conductive container serving as a fixed electrode, a flexible beam or bar-like spring horizontally cantilevered in the container and connected to one of two ends of an electrically conductive pin with the other end facing an exterior, and a steel ball provided as a weight at a free end side of the spring. The steel ball functions as a movable electrode which is brought into contact with and departed from the container.

In a normal stationary state of the free fall sensor of document 1, the spring is subjected to the gravity of the steel ball thereby to be flexed, whereby the steel ball is brought into contact with an inner face of the container such that an electrical path is formed. On the other hand, apparent gravitational acceleration acting on the steel ball is reduced during fall such that the steel ball is in zero gravity. As a result, the spring returns to the horizontal free state by its resilience, whereupon the steel ball parts from the inner face of the container, breaking the electrical path. Thus, the aforementioned free fall sensor is capable of detecting the fall state on the basis of break of the electrical path.

JP-A-2001-185012 (hereinafter, "document 2") discloses another free fall sensor. The free fall sensor disclosed in document 2 employs a compression coil spring as the spring and has substantially the same function as the above-described free fall sensor of document 1. In particular, a cylindrical weight is provided around the compression coil spring, so that the length of the sensor can further be reduced, whereupon the sensor can further be miniaturized.

However, a single bar-like spring is employed as the spring in the free fall sensor of document 1. In a case where the weight flexes the cantilevered free end when the sensor has suffered shock due to fall, bending stress is concentrated on the bar-like spring such that the spring is liable to be plastically deformed partially or buckled. Accordingly, the spring serving as the movable electrode cannot be retained at a normal position thereof for a long time of use, thereby resulting in an instable switching operation. Consequently, the sensor of document 1 has problems in the durability of the spring. Moreover, when the weight of the steel ball or the spring force of the spring is reduced for the purpose of further miniaturization of the free fall sensor, other factors of instability such as poor contact are added since a contact pressure is reduced between the steel ball and the conductive container. In consideration of the flexibility and durability of the spring and spherical weight, it is difficult to design and manufacture a free fall sensor which is well balanced in these respects. Thus, the free fall sensor of document 1 is unsuitable for further miniaturization and particularly for reduction in the thickness which has recently been desired keenly.

On the other hand, the compression coil spring used in the construction of document 2 can reduce the spring force and act effectively to return to the free state reliably in the occurrence of fall. Consequently, the freedom in the design of coil spring and weight can be increased. Moreover, since the coil spring has sufficient elasticity, it is effective in preventing partial buckling thereof as in the aforementioned bar-like spring. Further, even when the length of the compression coil spring is rendered smaller as compared with that of the bar-like spring, a sufficient amount of flexure can be achieved.

The construction that the cylindrical weight is provided around the coil spring is effective for reduction in the length thereof. However, this construction has a definite limitation in reduction in the thickness or height. For example, the overall thickness (or diameter) of the free fall sensor has a limit of about 5 mm. Additionally, it is never easy to produce a small-sized weight with high decision by gold-plating the weight in order that a unique shape of weight may serve as an electrode. Further, the assembly of the free fall sensor is complicated. Furthermore, the coil spring is superior to the bar-like spring since it is hard to suffer the plastic deformation due to buckling. However, the weight is applied as shock to the coil spring during fall, and moreover, the direction of shock is biased. Accordingly, there is a possibility that part of the coil spring may suffer plastic deformation, which results in an instable operation of the coil spring or which is a problem in the durability.

Furthermore, the weight forcibly collides against the conductive container when each of the above-described free fall sensors suffers shock due to fall, whereupon an abnormal sound is produced. Additionally, a point of contact is concentrated on a single point. Consequently, there is a possibility that soil may be interposed between the electrodes or a long time service of the sensor may result in formation of an oxide film between the electrodes. In this case, a stable electrical path cannot be formed. In particular, when the size of the free fall sensor is further reduced, the spring force tends to be reduced and the contact pressure also tends to be reduced. Thus, each above-described free fall sensor has a problem of further disadvantage in the practical use.

SUMMARY OF THE INVENTION

Therefore, an object of the present invention is to provide a free fall sensor which can restrain bucking and plastic deformation of the coil spring during fall while realizing miniaturization and which can expect a stable operation of the movable electrode for a long period of time.

The present invention provides a free fall sensor comprising an electrically conductive container, an electrically conductive pin having an end inserted into the container, and a movable electrode provided in the container, the movable electrode including a coil spring cantilevered on the end of the conductive pin and a weight provided in an inner space of the coil spring so as to be movable and so as to be prevented from falling off, wherein the weight is a sphere having a smaller diameter than the coil spring.

The weight is movably provided in the inner space of the coil spring in the above-described construction. Accordingly, the weight effective functions as the movable electrode without obstructing the flexure of the coil spring. Furthermore, the weight serves as a core for the coil spring thereby to prevent the coil spring from such a large deformation that results in buckling or plastic deformation during fall. Moreover, since the weight is disposed in the inner space of the coil spring, no portions radially protrude from the coil spring and the thickness of the electrode is reduced. Accordingly, the above-described construction is advantageous when a free fall sensor is rendered thinner and smaller in the size. Further, a middle of the coil spring vibrates up and down, thereby producing a damping effect. The damping effect can damp a sudden collision against the container, thus improving the durability of the weight and reducing sound due to collision. Still further, the electrodes are brought into contact with and parted from each other repeatedly. In this case, since minute vibration is absorbed, chattering of the switching function can be reduced. Additionally, every time the free end of the coil spring is brought into contact with the container, the coil spring is expanded and contracted in the lengthwise direction such that a contact face of each one of the coil spring and the container slides on the other. Consequently, soil and an oxide film on the contact faces can be wiped off and accordingly, a stable switching operation can be achieved for a long time even though the miniaturization of the free fall sensor tends to reduce the contact pressure between the electrodes.

BRIEF DESCRIPTION OF THE DRAWINGS

Other objects, features and advantages of the present invention will become clear upon reviewing the following description of the embodiments with reference to the accompanying drawings, in which:

FIGS. 5A to 5D are views of the free fall sensor in the states before and after assembly;

FIGS. 15A to 15D are views of the free fall sensor in the states before and after assembly;

DETAILED DESCRIPTION OF THE INVENTION

Figure 1:
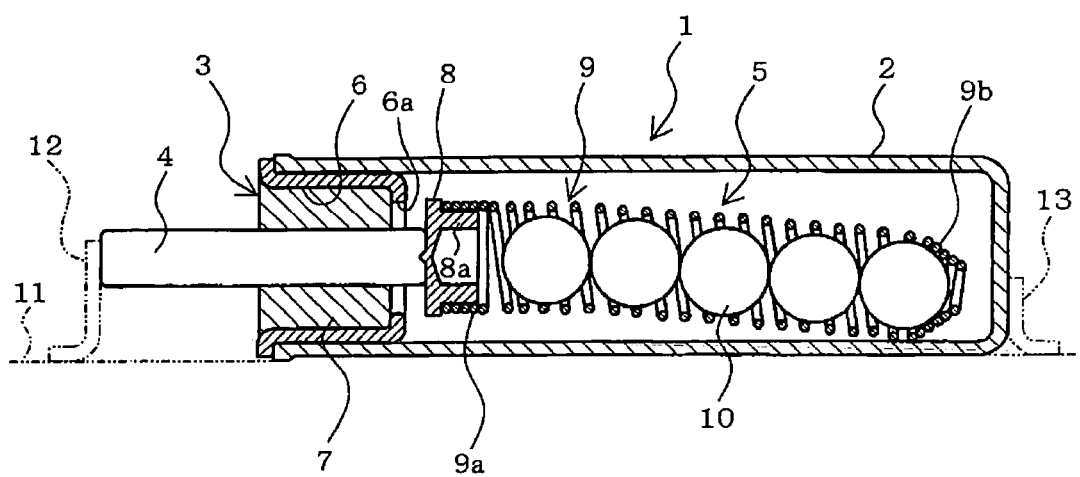
FIG. 1 is a sectional view of the overall construction of the free fall sensor in accordance with a first embodiment of the present invention.

A first embodiment of the present invention will be described with reference to FIGS. 1 to 5D. The free fall sensor 1 in accordance with the first embodiment is provided, for example, in a portable computer (not shown) such as a notebook-sized personal computer in an oblong state as shown in FIG. 1. The free fall sensor 1 comprises a slender cylindrical container 2 having an opening at one end, a closing member 3 for closing the opening of the container for electrical insulation and airtightness, an electrically conductive pin 4 extending in an airtight manner through the closing member 3 into the container 2, and a movable electrode 5 fixed to an end of the conductive pin 4 inside the container.

The container 2 is made of an electrically conductive metal and formed into the slender cylindrical shape with the one open end (the left end as viewed in FIG. 1). The conductive container 2 serves as a fixed electrode as will be described later.

The closing member 3 comprises a cylindrical frame 6 and an electrically conductive filler 7, such as glass, filling the interior of the frame. The conductive pin 4 extends horizontally through a centrally located through hole 3a formed in the bottom of the closing member 3. The frame 6 is force-fitted into the container 2 thereby to be fixed to the latter. Before the force-fitting, an inner peripheral surface of the container 2 and an outer peripheral surface of the frame 6 are electroplated with nickel and gold or gold alloy. Electroplated layers of the container 2 and frame 6 are integrated together as the result of force-fitting, whereupon the airtightness is improved. The frame 6 and container 2 may be welded by laser welding, instead.

The container 2 is airtightly closed and the conductive pin 4 is electrically insulated from the container 2. With this, the interior of the container 2 is evacuated or filled with an antioxidant gas such as gaseous nitrogen or gaseous helium in order that the inner peripheral surface of the container 2 serving as the fixed electrode may be prevented from oxidation for a long period of time.

The movable electrode 5 is disposed in the container 2 closed as described above. The movable electrode 5 is electrically brought into contact with and parted from the container 2 in subjection to fall, shock or the like. An electrically conductive disc-shaped spring seat 8 and an oblong compression coil spring 9 are coupled in turn to the end of the conductive pin 4 inside the container 2. A sphere 10 serving as a weight is provided in an inner space of the coil spring 9. The coil spring 9 is made of an electrically conductive metal such as phosphor bronze or stainless steel and formed into a cylindrical shape. The coil spring 9 is cantilevered on the spring seat 8a. When the weight of the sphere 10 is applied to a free end of the coil spring 9, the coil spring is flexed thereby to be brought into contact with the container 2. The coil spring 9 normally remains conductive as shown in FIG. 1.

Figure 2:
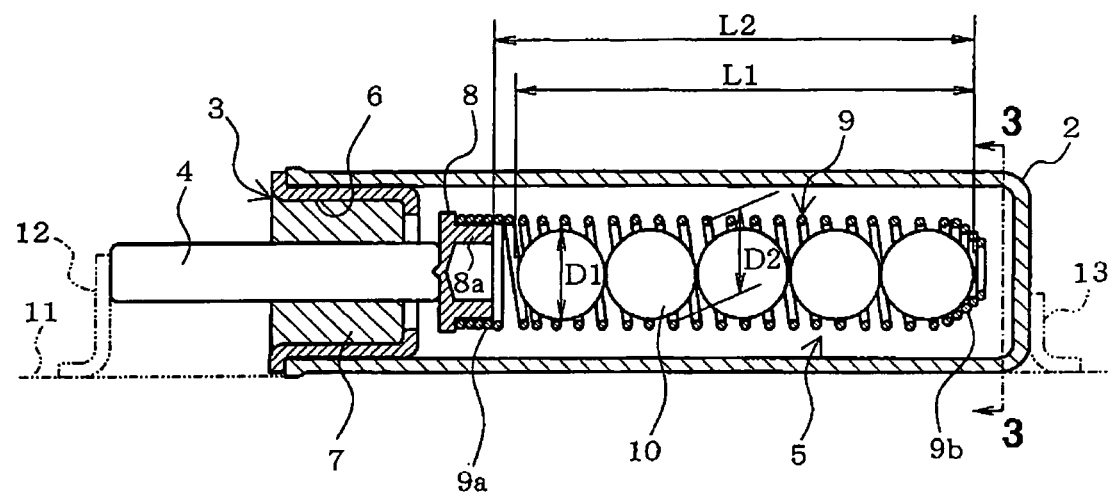
FIG. 2 is a view similar to FIG. 1, showing the free fall sensor under different condition.

The sphere 10 comprises a plurality of steel balls, for example, five steel balls in the embodiment. The steel balls are provided in the inner space of the coil spring 9 so as to be movable. More specifically, as shown in FIG. 2, the sphere 10 has a diameter D1 set so as to be smaller than an inner diameter D2 of the coil spring 9 (D1<D2). Five aligned steel balls have a total length L1 set so as to be smaller than substantially the effective free length L2 of the coil spring 9 (L1<L2). The sphere 10 is provided in the inner space of the coil spring 9 so as to be movable freely-and serves as a core protecting the coil spring as will be described later. Accordingly, the above-described free length L2 of the coil spring 9 is within a range of distance that the sphere 10 is moved. The diameter D1 of the sphere 10 is set to be not less than one half of the inner diameter D2 of the coil spring 9 (D1≧D2/2). Consequently, the steel balls constituting the sphere 10 are aligned so as to be prevented from being vertically laid one upon another and so as to be normally adjacent to one another transversely, whereupon the steel balls can be moved smoothly.

The coil spring 9 has a proximal end 9a is fixed to the above-described cylindrical portion 8a of the spring seat 8 by an electrically conductive adhesive agent, whereby the coil spring 9 is cantilevered. The spring seat 8 is made of a metal and the end of the conductive pin 4 located in the container 2 is welded to the central left end of the spring seat 8. The cylindrical portion 8a formed on the right end of the spring seat 8 has an outer diameter substantially equal to the inner diameter D2 of the coil spring 9. The proximal end of the coil spring 9 or a closely wound portion thereof is fitted with the cylindrical portion 8a to be fixed to the latter by an electrically conductive adhesive agent.

The coil spring 9 has the other end or free end having a reduced diameter smaller than the diameter D1 of the sphere 10, so that the sphere 10 is held in the inner space of the coil spring. More specifically, the free end of the coil spring 9 is closely wound so as to be formed into a conical closely wound portion 9b. This portion serves as means for preventing the sphere 10 from falling off. Accordingly, the sphere 10 is previously inserted through an opening at the proximal end 9a side into the inner space of the coil spring 9 and thereafter, the coil spring 9 is fixed to the spring seat 8.

Thus, the coil spring 9 is cantilevered on the spring seat 8, and the sphere 10 is provided in the inner space of the coil spring so as to be movable and comprises a plurality of steel balls. As a result, the sphere 10 effectively functions as a weight resiliently flexes the coil spring 9. The coil spring 9 is inclined downward relative to the horizontal axis in the container 2 as shown in FIG. 1. The distal end of the coil spring 9 is normally in contact with the inner face of the container 2. The free fall sensor 1 having the above-described construction is disposed on a conductive pattern (not shown) of a printed circuit board 11 as shown by two-dot chain line in FIG. 1. A lead wire 12 is soldered to one end of the conductive pin 4 located outside the container 2. An L-shaped metal contact 13 is welded to the underside of the container 2, whereupon an electrical path is formed so as to be conductive to the printed circuit board 11.

The electrical path is normally formed as the result of contact between the coil spring 9 and the container 2. The sphere 10 is adapted not to prevent the flexure of the coil spring 9. The coil spring 9 with the inner space in which the sphere 10 is cantilevered functions as the movable electrode 5, whereas the container 2 fixedly mounted on the printed circuit board 11 functions as a fixed electrode. The coil spring 9 and container 2 constitute a switching mechanism. The aforesaid printed circuit board 11 is fixed inside the portable computer and connected to a central processing unit (CPU; and not shown). A conduction signal is supplied from the printed circuit board 11 to CPU when a section between the lead wire 12 and the contact 13 is electrically conductive.

The operation of the free fall sensor will now be described. In a stationary or normal state, the central axis is substantially horizontal as shown in FIG. 1, and the gravity of the sphere 10 elastically flexes the cantilevered beam-like coil spring 9 such that the free end of the coil spring is in contact with the inner surface of the container 2. Consequently, electric current flows through the lead wire 12, conductive pin 4, the coil spring 9 with the sphere 10 enclosed in the inner space thereof (the movable electrode 5), container 2 serving as the fixed electrode, and the contact 13. Thus, the free fall sensor 1 serves as a normally closed switch. An electrical path to the printed circuit board 11 is thus formed, whereby the conduction signal is supplied to CPU.

On the other hand, the coil spring 9 is disconnected from the container 2 while the portable computer is in a falling state, as shown in FIG. 2. More specifically, the gravity applied to the sphere 10 is apparently reduced when the portable computer is in the falling state. Accordingly, the coil spring 9 is displaced by the spring force or elastic restoring force thereof so as to be returned toward the central side of the container 2. When the gravity applied to the sphere 10 is reduced to zero gravity, the free end of the coil spring 9 is completely parted from the inner surface of the container 2, whereupon the section between the lead wire 12 and the contact 13 is completely cut off (OFF level).

CPU detects the OFF level of the conduction signal and supplies an ABNORMAL STATE signal to an inner drive circuit (not shown). The drive circuit is provided for driving a disk head of an internal hard disk, for example. Upon detection of the ABNORMAL STATE signal, the drive circuit moves the disk head to a retreat position, thereby interrupting reading data and program from the hard disk or writing data and program into the hard disk. Thus, an evasive process is carried out to render the possibility of damage to the data or disk head minimum.

Furthermore, a characteristic operation of the movable electrode 5 will now be described with reference to FIGS. 4A to 5D. Necessary gravity is obtained from the sphere 10 comprising five steel balls and serving as a weight in the embodiment. Since the sphere 10 is allowed to be moved sufficiently particularly in the direction of elongation of the coil spring 9 and is spherical, the sphere has no such resistance as to prevent the flexure of the coil spring. Moreover, the sphere 10 functions as a core provided in the inner space of the coil spring 9, thereby acting as a resistor effectively suppressing a large bending resulting in buckling or plastic deformation of the coil spring.

Figure 4A:
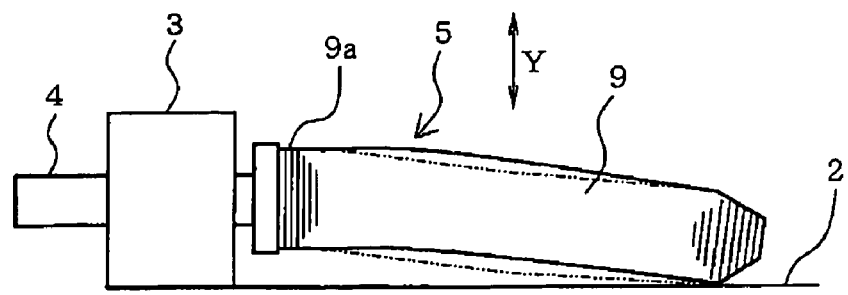
FIGS. 4A to 4C are schematic views explaining the operation of the free fall sensor in different modes.
Figure 4B:
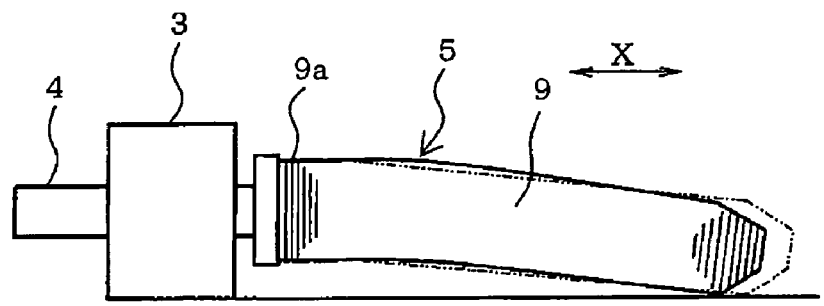
Figure 4C:
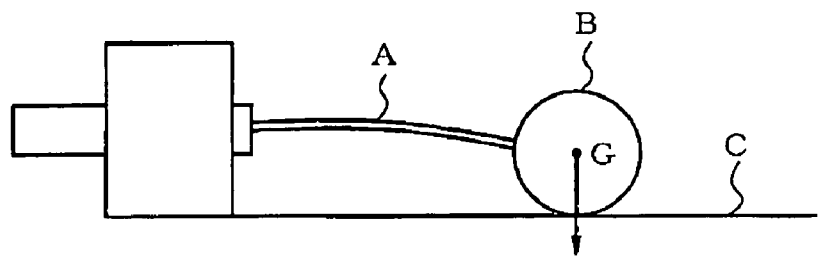

The sphere 10 further has a damping action as shown in FIGS. 4A and 4B. FIG. 4C shows a prior art construction. The damping action will now be described with reference to FIG. 4A. The cantilevered coil spring 9 has a larger amount of downward elastic deformation at the free end side than at the other portion thereof. In order that a reliable contact with the container 2 may be ensured, the sphere 10 comprising five steel balls are disposed in the inner space of the coil spring 9, whereby required weight is ensured. The coil spring 9 is cantilevered at the proximal end thereof and the free end side thereof is brought into a sudden contact or collides with the container 2. In this case, the middle portion of the coil spring 9 is elastically deformed up and down, thereby vibrating up and down as shown by arrow Y in FIG. 4A. As a result, the shock due to collision can be received so as to be dampened. Thus, a shock damping effect by the damping action can be achieved. Moreover, since the free end of he coil spring 9 is kept in contact with the inner face of the container 2, frequent bounce (repeated collision) can be prevented and accordingly, the vibration can be reduced to a large extent.

Furthermore, the coil spring 9 constituting the movable electrode 5 has the proximal end 9a closely wound and fixed to the spring seat as shown in FIGS. 1 and 2. This can increase the mechanical strength of the movable electrode 5 against the shock in the falling and can diffuse the bending stress and the like due to shock in the falling without concentration of the bending stress and the like, thereby ensuring the flexibility. Accordingly, plastic deformation and buckling can further be prevented.

On the other hand, it is effective to fill the airtight container 2 with, for example, nitrogen gas so that oxidation can be prevented. However, an electrode surface of the contact portion of the container 2 or coil spring 9 would be oxidated or soiled by oxidation of the contact portion or soil before filling of the nitrogen gas. As a result, there is a possibility that stable conduction may not be achieved. In the embodiment, however, every time the coil spring 9 collides with the container 2, an elastic expansion and contraction action in the direction of elongation (shown by arrow X in FIG. 4B) as a characteristic of the coil spring is achieved as well as the aforementioned damping action. Consequently, a wiping effect is obtained that a contact portion slides right and left when subjected to vibration or shock due to the falling. Soil and an oxide film on the contact face can be removed by the wiping effect. Accordingly, the switching operation stable for a long period of time can be realized even when the contact pressure of the electrode tends to be reduced as the result of miniaturization of the free fall sensor.

In the prior art construction as shown in FIG. 4C, a cantilevered bar-shaped spring A is provided with a weight B of steel ball. The weight B is brought into contact with a container C at a point below the center of gravity G of the weight. Accordingly, the single spring A is liable to be deformed due to buckling as described above. Moreover, this tendency is more conspicuous as the spring force is rendered small by reduction in the diameter of the bar-shaped spring. Thus, the prior art construction is unsuitable for reducing the spring force. As a result, the weight B is restricted by miniaturization of the free fall sensor. Moreover, since the weight B is brought into contact with the container C at the point below the center of gravity G of the weight, there is a possibility that a stable conductive state may not be obtained when the contact faces are soiled or oxidated by a long time of service. Thus, the prior art construction is disadvantageous for further size reduction.

Further, in the embodiment, the conductive pin 4 is connected to one of the ends of the spring seat 8 and the coil spring 9 is connected to the other end of the spring seat when the coil spring is cantilevered so as to be disposed in the form of a beam. In this case, it is desirable that the conductive pin 4, spring seat 8 and coil spring 9 should be connected linearly on a horizontal central axis. In particular, a gap between the coil spring 9 and the container 2 is reduced as the free fall sensor becomes thinner or smaller in size. Further, the accuracy in the central axis of the incorporated coil spring 9 is important in order that a stable switching operation may be achieved irrespective of a mounting angle (360 degrees). Yet, the coil spring 9 is flexible and accordingly, it is not always easy to align the coil spring 9 on a central axis.

In the embodiment, however, the central axis of the coil spring 9 can easily be adjusted, whereupon the required assembly accuracy can be ensured. With reference to FIGS. 5A to 5D, the following describes means for adjusting the movable electrode 5. FIGS. 5A to 5D show an assembly comprising the conductive pin 4 airtightly inserted through a hole 3a of the closing member 3 and the coil spring 9 including the spring seat 8 and sphere 10 constituting the movable electrode 5, that is, the assembly which is to be force fitted into the container 2. FIGS. 5A and 5C show the assembly prior to adjustment, whereas FIGS. 5B and 5D show the assembly after adjustment. FIG. 5A shows the assembly disposed vertically in the natural state, whereas FIG. 5C is a view as seen from the free end side of the coil spring 9 or in the direction of arrow B. FIG. 5B shows the assembly disposed vertically in the natural state, whereas FIG. 5D is a view as seen from the free end side of the coil spring 9 or in the direction of arrow B.

When the central axis (shown by central line R0) of the assembly is inclined slightly rightward at this assembly stage as shown by symbol R1 in FIGS. 5A and 5C, the circular outer-diameter portion of the coil spring 9 is eccentric relative to the circular closing member 3. Accordingly, in what direction the coil spring 9 is inclined can be visually confirmed readily. Then, as shown in FIG. 5B, a suitable portion of the spring seat 8 is held by tweezers, for example, and is flexed slightly in the direction of arrow E or F so that the inclination is corrected. It is confirmed that the coil spring 9 has been adjusted to a central position as shown in FIG. 5D. As a result, the coil spring 9 can be disposed about the central axis, that is, the movable electrode 5 can be disposed about the central axis. Although the spring seat 8 is welded to the conductive pin 4 as described above, the coil spring 9 is fitted with the cylindrical portion 8a of the spring seat 8 thereby to be fixed, a slight angular displacement of the spring seat 8 can realize the aforesaid adjustment of central axis.

The assembly adjusted as described above is force-fitted into the container 2 so that the free fall sensor is finally completed. The free fall sensor of the embodiment can be thickened to about 1 mm and can be practically usable although the thickness of the conventional free fall sensor is has been reduced to about 5 mm at the smallest.

The following effects can be achieved from the foregoing embodiment. Since the container 2 serving as the fixed electrode, the coil spring serving as the movable electrode 5 and the like are each formed into a circular shape, the free fall sensor can readily be incorporated into the equipment such as a portable computer without limitation of a mounting angle. The free fall sensor thus produced can detect the falling state of the equipment by a normal switching operation, so that a quick countermeasure can be taken.

Furthermore, the following are particularly eminent characteristics of the free fall sensor of the embodiment. Firstly, since the sphere 10 constituting the weight of the movable electrode 5 is disposed in the inner space of the coil spring 9, the sphere 10 prevents the coil spring 9 from deformation when the coil spring is excessively bent. Thus, the sphere 10 serves as a core for the coil spring 9. More specifically, the sphere 10 effectively functions to restrain such a large deformation as to result in the buckling or plastic deformation of the coil spring 9 upon occurrence of shock due to the falling. Further, since the coil spring 9 substantially defines the outer diameter of the free fall sensor, the construction is advantageous when the diameter of the sensor is reduced so that the sensor is thinned. Further, the sphere 10 has a diameter smaller than the inner diameter of the coil spring 9 and the overall length L1 of the sphere is reduced, so that the sphere 10 is movable in the direction of the free length thereof. Consequently, nothing prevents the coil spring 9 serving as the movable electrode 5 from flexure.

Further, the weight comprises the sphere 10 further comprising a plurality of steel balls. The sphere 10 can easily be obtained by casting at low costs. Further, a plurality of steel balls employed as the sphere 10 are advantageous in adjusting and setting the weight of the sphere. Moreover, the free end of the coil spring 9 is closely wound so as to be formed into a conical closely wound portion 9b serving as means for preventing the sphere in the inner space of the coil spring 9 from falling off. Since the coil spring 9 can be prevented from falling off by itself, other components or fixing means is required and moreover, the proximal end of the coil spring 9 serving as the movable electrode 5 is easily joined to the spring seat. As a result, the free fall sensor has an improved assembling efficiency and high accuracy and is accordingly further advantageous in the costs. Further, since the proximal end of the coil spring 9 is closely wound, a sufficient bonding strength can be obtained and the construction is resistant against large shock in the falling and effective in preventing the coil spring 9 from easily buckling.

Further, the movable electrode 5 comprises the coil spring 9 with the movable sphere 10 disposed in the inner space of the coil spring. Accordingly, when the movable electrode 5 collides with the container 2 serving as the fixed contact, the shock due to collision can be received so as to be dampened. Thus, a shock damping effect by the damping action can be achieved. More specifically, it is conventionally the weight that collides against the container but in the foregoing embodiment, the coil spring 9 is interposed, whereupon the silencing effect can be expected. Moreover, the middle portion of the coil spring vibrates while the distal end of the coil spring is in contact with the inner face of the container or kept in such a tendency. Accordingly, the shock due to the falling is damped, and the number of bound can be rendered minimum and a bounding distance can be rendered small. Consequently, noise due to the collision can effectively be reduced. Further, the chattering of the switching function due to repeated contact and separation of the electrodes can be reduced and accordingly, the possibility of malfunction resulting from turn-off of the free fall sensor can be avoided, for example.

The sound produced by the collision between the coil spring 9 and the container 2 may be an abnormal sound when the portable computer incorporated with the free fall sensor as well as in the falling. In this case, too, the damping action is effective, thereby improving the product value. Further, the free end of the coil spring 9 is closely wound into the conical closely wound portion 9b, which portion is brought into contact with the container 2. Accordingly, even when the portion 9b is repeatedly caused to collide against the container 2 in the falling, a sufficient strength can be ensured, and the sound due to the collision is also reduced by the damping action.

Bending stress or the like is apt to be concentrated on the vicinity of the junction of the proximal end 9a by the damping action in the falling as well as in the normal stationary state. In the foregoing embodiment, however, the compression coil spring has flexibility and the closely wound portion thereof is fixed via the spring seat 8 to the conductive pin 4. Consequently, the stress can be diffused and the deformation due to buckling can be prevented. Thus, the switching operation between the coil spring 9 and the inner face of the container 2 can be maintained in a stable state for a long period of time, whereby the reliability of the sensor can be improved.

In the foregoing embodiment, the damping effect is obtained from vertical expansion and contraction of the coil spring 9, whereas the wiping effect is obtained from the effective use of the lengthwise expansion and contraction as disclosed with reference to FIG. 4B. More specifically, the free end of the coil spring 9 slides right and left on the inner face of the container 2 while in contact with the latter, whereby soil or oxide film on each contact face is removed. This can provide a stable switching operation for a long period of time and in particular, this can wipe out the possibility of unstable operation due to reduction in the contact pressure between the electrodes for miniaturization of the sensor.

Further, a space around the coil spring 9 constituting the movable electrode 5 is designed to be minimum in order that the free fall sensor 1 may be miniaturized and particularly thinned. For example, when the thickness of the sensor is not more than 1.7 mm, the space becomes several tenths mm wide. Accordingly, the connection of the coil spring 9 to the conductive pin 4 requires linear connection on a horizontal central axis. Since the coil spring 9 is connected directly to the conductive pin 4, there is no problem when the coil spring 9 constitutes the movable electrode. However, the working efficiency is reduced if a high accurate assembling work is required in connection of the coil spring 9. Accordingly, it is desirable to be able to adjust the axis of the coil spring 9 easily after fixation. In the foregoing embodiment, since the spring seat 8 is interposed between the conductive pin 4 and the coil spring 9, the axis of the coil spring can be adjusted by a slight displacement of the spring seat 8 supporting the coil spring as described above with reference to FIGS. 5A to 5D.

Thus, the coil spring 9 can accurately be disposed as the movable electrode 5. Accordingly, the coil spring 9 can suitably be disposed in a narrow space in the container 2 for the thinning of the sensor. Moreover, the falling state can accurately be detected even when the coil spring 9 is incorporated in every direction. As a result, the possibility of thinning the sensor can be increased and the free fall sensor of the embodiment is effective when the size and weight of the portable computer is further reduced and in particular, when the portable computer is rendered further thinner.

In the foregoing embodiment, the conical closely wound portion 9b is formed as the means for prevent the sphere 10 from falling off from the free end of the coil spring 9. However, fall-off preventing means should not be limited to the above construction but may be modified into various forms. Modified forms of the fall-off preventing means will be described with reference to FIGS. 6 to 10 (corresponding to second to second to fourth embodiments respectively). In the second to fourth embodiments, identical or similar parts are labeled by the same reference symbols as those in the foregoing embodiment and will not be described. Only the difference between each of the second to fourth embodiments and the first embodiment will be described.

Figure 3:
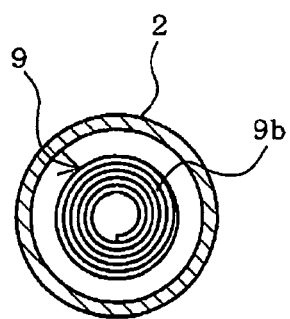
FIG. 3 is a section taken along line 3-3 in FIG. 2.
Figure 6:
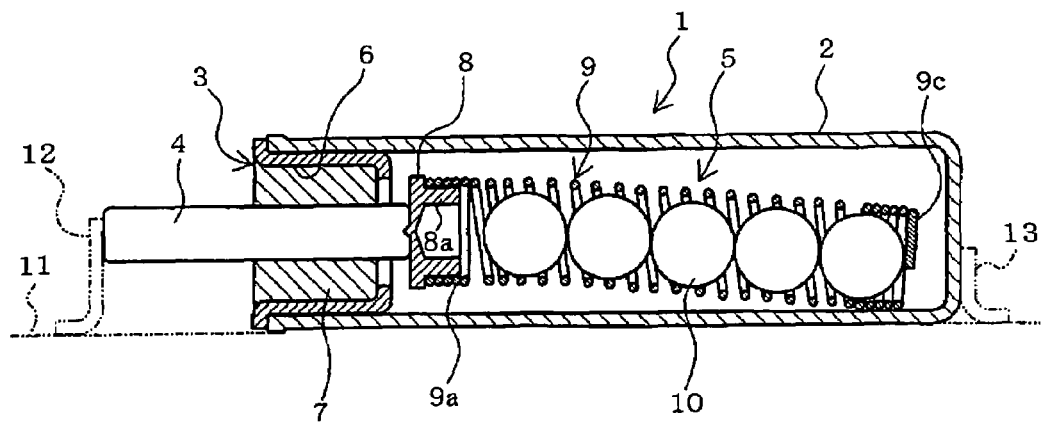
FIG. 6 is a view similar to FIG. 1, showing the free fall sensor of a second embodiment in accordance with the invention.
Figure 7:
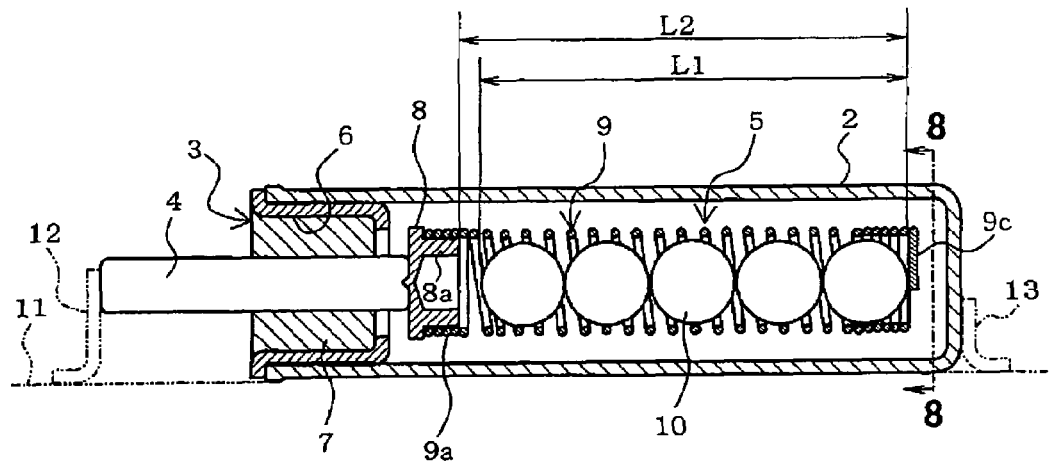
FIG. 7 is a view similar to FIG. 2.
Figure 8:
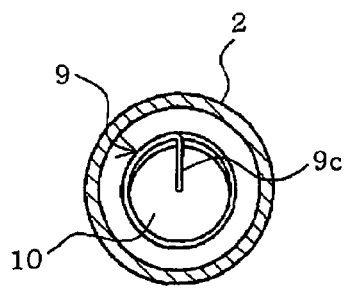
FIG. 8 is a sectional view taken along line 8-8 in FIG. 7.

FIGS. 6 to 8 illustrate the second embodiment of the invention and correspond to FIGS. 1 to 3 in the first embodiment respectively. The free fall sensor of the second embodiment has substantially the same construction as that of the first embodiment except the fall-off preventing means. More specifically, the free end of the coil spring 9 is closely wound but has a cylindrical shape, instead of the conical closely wound portion 9b. The free end includes a bent terminal 9c formed by bending the terminal radially. The bent terminal 9c extends centrally thereby to divide the open end substantially into two parts, whereupon the cylindrical opening is substantially closed. Consequently, the sphere 10 is abutted against the bent terminal 9c thereby to be prevented from falling off. The free fall sensor of the second embodiment has the same function as that of the first embodiment and achieves the same effect as that of the second embodiment.

Figure 9:
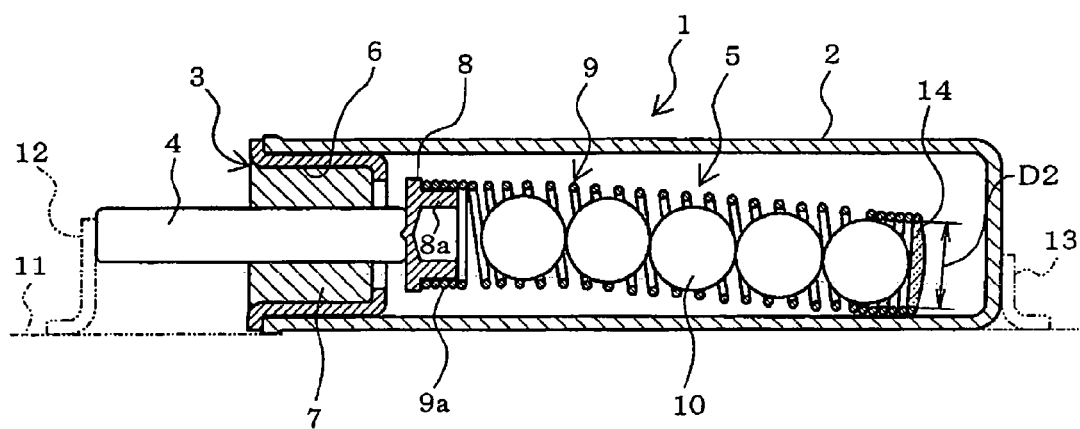
FIG. 9 is a view similar to FIG. 1, showing the free fall sensor of a third embodiment in accordance with the invention.

FIG. 9 illustrates a third embodiment of the invention. In each of the foregoing embodiment, the coil spring 9 is itself machined so as to constitute the fall-off preventing means. In the third embodiment, however, an electrically conductive bonding agent 14 is applied to the coil spring 9 to constitute the fall-off preventing means. More specifically, the free end of the coil spring 9 is closely wound in the same manner as in the foregoing embodiments and remains open. The bonding agent 14 is applied to the free end of the coil spring 9 so as to close the opening and then hardened.

Consequently, the open free end of the coil spring 9 is closed by the bonding agent 14 hardened into the shape of a film, which serves to prevent the sphere 10 enclosed in the inner space of the coil spring 9 from falling off. A sufficient amount of the bonding agent is small since the inner diameter D2 of the coil spring 9 is about 1.0 mm which is extremely small. Since the coil spring 9 has an extremely small size, part of the bonding agent may be forced out of the coil spring. However, since the conductive bonding agent is employed as the bonding agent 14 in the embodiment, electrical conduction to the container 2 cannot be prevented. The electrical conductivity is not always required although use of the conductive bonding agent has an advantage as described above. Further, the open free end of the coil spring 9 may or may not be completely closed by the bonding agent 14.

Figure 10:
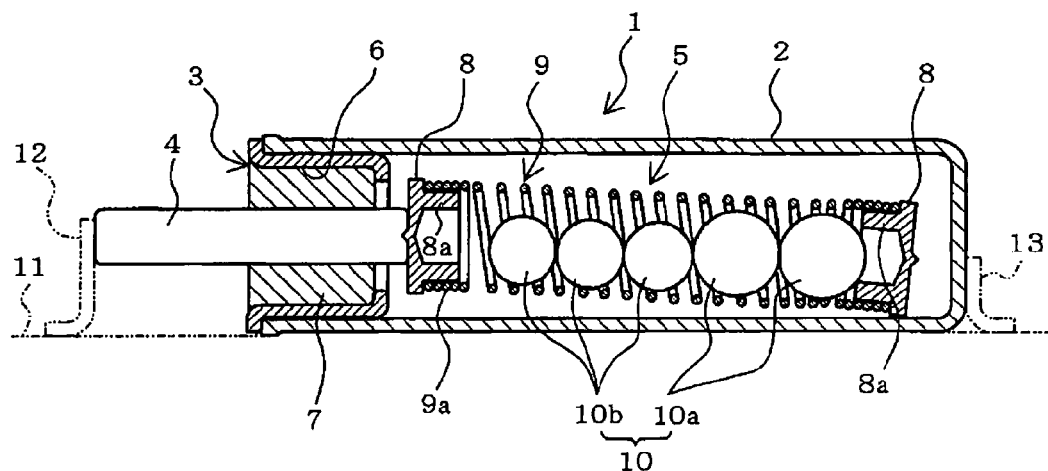
FIG. 10 is a view similar to FIG. 1, showing the free fall sensor of a fourth embodiment in accordance with the invention.

FIG. 10 illustrates a fourth embodiment of the invention and corresponds to FIG. 1. Two spring seats 8 are employed in the fourth embodiment. Thus, the spring seats 8 are fitted in the proximal and free ends of the coil spring 9 respectively. More specifically, the coil spring 9 is cylindrical as in the third embodiment. Both proximal and free ends of the coil spring 9 are closely wound. The proximal end of the coil spring 9 is fixed to the conductive spring seat 8 and the free end of the coil spring is fitted with the cylindrical portion 8a of the spring seat 8 and fixed by conductive bonding agent. Further, the sphere 10 includes steel balls with two different diameters. For example, two steel balls 10a each having a larger diameter and heavier than the others are disposed at the free end side, whereas three steel balls 10b each having a smaller diameter and lighter are disposed at the proximal end side in the inner space of the coil spring. The other construction of the free fall sensor is the same as that in the third embodiment.

The sphere 10 also functions as the core of the coil spring 9 in the falling, whereupon an excessive bending deformation of the coil spring 9. Further, the spring seat 8 can be utilized as the fall-off preventing means for the sphere 10. As a result, no new components are added. Moreover, a unit including the coil spring 9 and the sphere 10 can be realized. In the unit, the sphere 10 is enclosed in the inner space of the coil spring so as to be prevented from fall-off. As a result, the unit can easily be handled in the storage or transfer. For example, the unit can be welded to the conductive pin 4, and thus, the construction with wide use in the assembly can be obtained.

Further, the metal spring seat 8 provided at the free end side is subjected to the gravity of the sphere 10 thereby to be brought into direct contact with the container 2. The contact state of the rigid body is more satisfactory as compared with the contact by the elastic coil spring or the contact via the conductive bonding agent as described in the foregoing embodiments. The spring seat 8 is advantageous in that it functions as a movable contact for the movable contact. Moreover, two of the five steel spheres serve as heavier balls each having a larger diameter. These steel balls are disposed at the free end side of the coil spring 9. This can result in a more reliable contact between the coil spring serving as the movable electrode 5 and the container 2.

In the foregoing embodiments, the steel balls with different diameters are used so as to have two different weights. For example, however, two different materials may be employed for the sphere 10 with the same diameter, instead. Further, the number of steel balls may be set according to the specifications of the coil spring 9 or modified.

Figure 11:
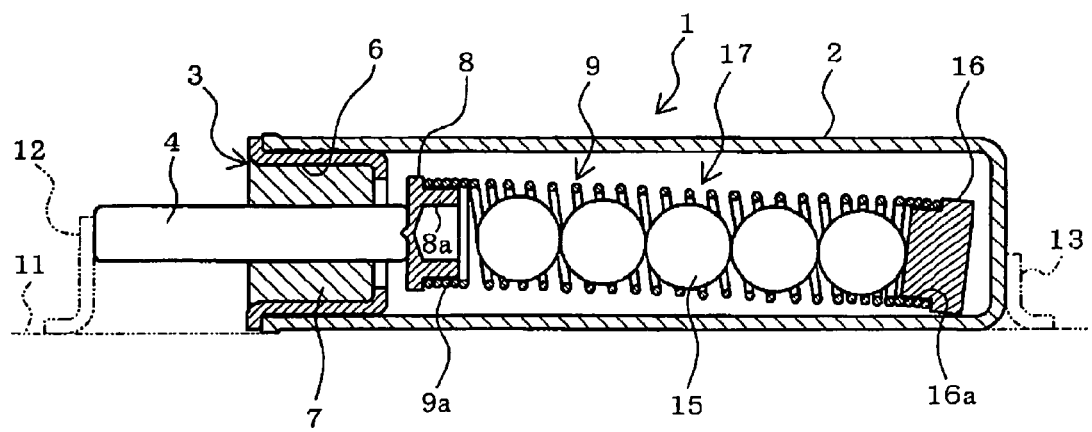
FIG. 11 is a view similar to FIG. 1, showing the free fall sensor of a fifth embodiment in accordance with the invention.

FIG. 11 illustrates a fifth embodiment of the invention and corresponds to FIG. 1. In the fifth embodiment, identical or similar parts are labeled by the same reference symbols as those in the first embodiment and will not be described. Only the difference between the fifth and first embodiments will be described.

The sphere 10 comprising the steel balls is employed as the weight in the foregoing embodiments. In the fifth embodiment, a sphere 15 made of a light-weight material such as plastics or aluminum is employed and a fall-off preventing member 16 comprising another member which also serves as the weight is provided. The sphere 15 and the fall-off preventing member 16 constitute the movable electrode 17. More specifically, the sphere 15 functions as the core of the coil spring 9 but does not function as the weight. Then, the fall-off preventing member 16 is attached to the free end of the coil spring 9 so as to serve as the fall-off preventing member for the sphere 15. The fall-off preventing member 16 comprises a conductive member with a large weight. The fall-off preventing member 16 is formed into a cylindrical shape and has at one end thereof a stepwise small-diameter portion 16a. The closely wound free end of the coil spring 9 is fitted with the small-diameter portion 16a and fixed by the conductive bonding agent. The fall-off preventing member 16 has a slightly larger outer diameter than the coil spring 9. The required weight can readily be set by adjustment of the length as well as the diameter.

The same effect is achieved from the fifth embodiment as from the first embodiment. Further, since the weight is adjusted by a single fall-off preventing member 16, the weight setting can be carried out easier as compared with the first embodiment in which a plurality of steel balls constitute the sphere 10. Furthermore, the fall-off preventing member 16 also serves as a contact of the movable electrode 17 which is brought into contact with the container 2. Accordingly, reliable contact can be achieved as compared with the first embodiment in which the coil spring 9 is brought into contact with the container. As a result, the fifth embodiment is superior to the first embodiment since the reliably contact state can be achieved and functions for a long period of time.

The fall-off preventing member sensor may become slightly larger and the length thereof maybe increased since the fall-off preventing member serves as the weight. However, the sphere 15 in the fifth embodiment is not required to serve as the weight, the increase in the length of the fall-off preventing member 16 can be restrained by the adjustment including the reduction in the number and the diameter of steel balls together with the adjustment of the coil spring 9. In particular, the length of the fall-off preventing member 16 does not prevent the free fall sensor from compactness by rendering it thinner. Further, although the fall-off preventing member 16 which also serves as the weight is employed in the embodiment, a dedicated fall-off preventing member and a dedicated weight may be provided, instead.

The invention should not be limited by the foregoing embodiments described with reference to the drawings. For example, the shape of the spring seat to which the proximal end of the coil spring is fixed may be modified, or the shape of the fall-off preventing means may be modified. Further, the proximal and free ends of the coil spring are closely wound and accordingly, advantageous in the strength. However, these ends may be closely wound if necessary. Further, the number of steel balls should not be limited to five but may be one or two. The sphere should not be limited to steel balls. Further, the materials for the sphere may have different masses. The weight adjustment can be made by a sphere with the aforementioned combined structure. For example, various combinations are possible as alternatives so that the gravity becomes larger at the coil spring side, and minute adjustment is possible. Further, the weight may be provided on another member in order that the sphere serving as the core may protect the coil spring against shock. Thus, the invention may be modified without departing from the scope thereof.

Figure 12:
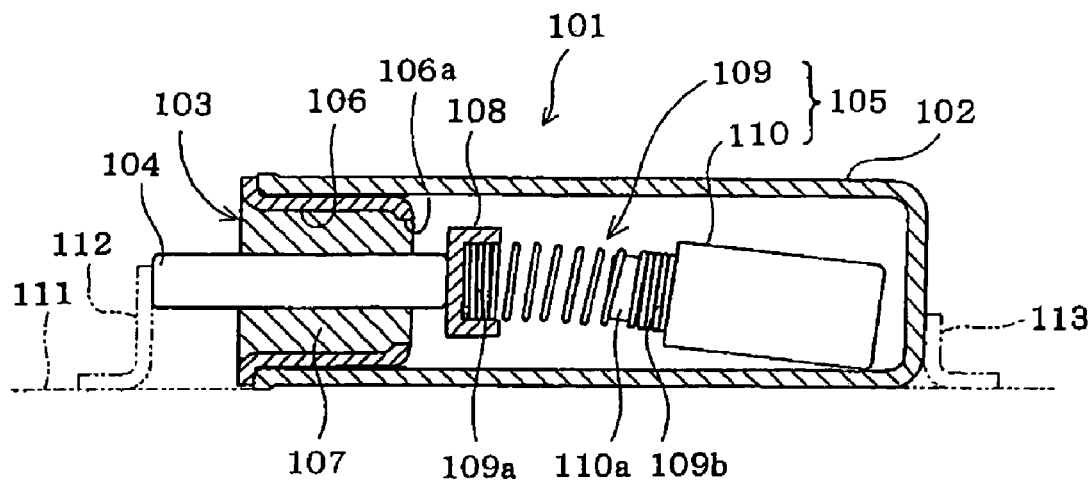
FIG. 12 is a sectional view of the free fall sensor of a sixth embodiment in accordance with the invention.
Figure 13:
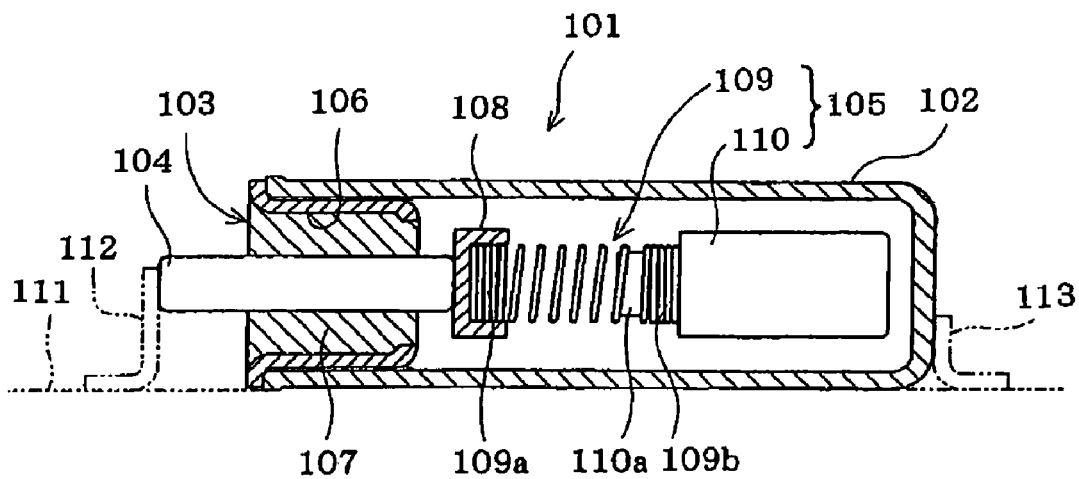
FIG. 13 is a view similar to FIG. 12, showing the free fall sensor in another state.

FIGS. 12 to 15 illustrate a sixth embodiment of the invention. FIG. 12 is a sectional view of the free fall sensor 1, showing the normal state in use (stationary state), and FIG. 13 is a view similar to FIG. 1, showing another operating state of the free fall sensor in the falling. The construction of the free fall sensor will be described with reference to FIGS. 12 and 13.

The free fall sensor 101 is provided, for example, in a portable computer (not shown) such as a notebook-sized personal computer in an oblong state as shown in FIG. 12. The free fall sensor 101 comprises a slender cylindrical container 102 having an opening at one end, a closing member 103 for closing the opening of the container for electrical insulation and airtightness, an electrically conductive pin 104 extending in an airtight manner through the closing member 103 into the container 102, and a movable electrode 105 fixed to an end of the conductive pin 104 inside the container. More specifically, the container 102 is made of an electrically conductive metal and formed into the slender cylindrical shape with the one open end (the left end as viewed in FIG. 12). The conductive container 102 serves as a fixed electrode as will be described later.

The closing member 103 comprises a cylindrical frame 106 and an electrically conductive filler 107, such as glass, filling the interior of the frame. The conductive pin 104 extends horizontally through a centrally located through hole 103a formed in the bottom of the closing member 103. The frame 106 is force-fitted into the container 102 thereby to be fixed to the latter. Before the force-fitting, an inner peripheral surface of the container 102 and an outer peripheral surface of the frame 106 are electroplated with nickel and gold or gold alloy. Electroplated layers of the container 102 and frame 106 are integrated together as the result of force-fitting, whereupon the airtightness is improved. The container 102 is airtightly closed and the conductive pin 104 is electrically insulated from the container 102. With this, the interior of the container 102 is evacuated or filled with an antioxidant gas such as gaseous nitrogen or gaseous helium in order that the inner peripheral surface of the container 102 serving as the fixed electrode may be prevented from oxidation for a long period of time.

The movable electrode 105 is disposed in the container 102 closed as described above. The movable electrode 105 is electrically brought into contact with and parted from the container 102 in subjection to fall, shock or the like. An electrically conductive disc-shaped spring seat plate 108 and an oblong compression coil spring 109 are coupled in turn to the end of the conductive pin 104 inside the container 102. A weight 110 serving as a weight is provided in an inner space of the coil spring 109. More specifically, the spring seat plate 108 is made of a metal and formed into the shape of a circular dish. The central rear of the spring seat plate 108 is welded to the conductive pin 104. The coil spring 109 is fixed by an electrically conductive bonding agent to a receiving dish-shaped side of the seat plate 108. The dish-shaped portion of the seat plate 108 has an inner diameter substantially equal to the outer diameter of the coil spring 109 and receives one end of the coil spring 109. The coil spring 109 is made of an electrically conductive metal such as phosphor bronze and includes a portion fixed to the seat plate 108 and serving as a closely wound portion 109a relative to a middle coarsely wound portion.

The other or free end of the coil spring 109 is also formed into a closely wound portion 109b, to which portion one end of the weight 110 is fixed. The weight 110 is made of an electrically conductive metal such as copper and formed into an oblong cylindrical member with a silver-plated surface. The weight 110 has a length substantially twice as large as the diameter thereof or above and an outer diameter substantially equal to (strictly, slightly larger than) an outer diameter of the coil spring 109. The end of the weight 110 connected to the coil spring 109 is formed with a columnar mount 110a having a slightly smaller diameter. The mount 110a has an outer diameter substantially equal to an inner diameter of the coil spring 109. The closely wound portion 109b of the coil spring 109 is fitted with the mount 110a and fixed by the conductive bonding agent.

Thus, the coil spring 109 is cantilevered on the spring seat 108, and the weight 110 is inclined downward relative to the horizontal axis in the container 102 and the distal end thereof is normally in contact with the inner face of the container 102 as shown in FIG. 12. The free fall sensor 101 having the above-described construction is disposed on a conductive pattern (not shown) of a printed circuit board 111 as shown by two-dot chain line in FIG. 12. A lead wire 112 is soldered to one end of the conductive pin 104 located outside the container 102. An L-shaped metal contact 113 is welded to the underside of the container 102, whereupon an electrical path is formed so as to be conductive to the printed circuit board 111.

The electrical path is normally formed as the result of contact between the coil spring 109 and the container 102. The coil spring 109 and weight 110 constitute a movable electrode 105, whereas the container 102 serves as a fixed electrode, whereupon the coil spring 109, weight 110 and container 102 constitute a switching mechanism. The aforesaid printed circuit board 111 is fixed inside the portable computer and connected to CPU (not shown). A conduction signal is supplied from the printed circuit board 111 to CPU when a section between the lead wire 112 and the contact 113 is electrically conductive.

The operation of the free fall sensor will now be described. In a stationary or normal state, the central axis is substantially horizontal as shown in FIG. 1, and the gravity of the weight 110 elastically flexes the cantilevered beam-like coil spring 109 such that the free end of the coil spring is in contact with the inner surface of the container 102. Consequently, electric current flows through the lead wire 112, conductive pin 104, movable electrode 105 (coil spring 109 and weight 110), container 102 serving as the fixed electrode, and the contact 113. Thus, the free fall sensor 101 serves as a normally closed switch. An electrical path to the printed circuit board 111 is thus formed, whereby the conduction signal is supplied to CPU.

On the other hand, the weight 110 is disconnected from the container 102 while the portable computer is in a falling state, as shown in FIG. 13. More specifically, the gravity applied to the weight 110 is apparently reduced when the portable computer is in the falling state. Accordingly, the coil spring 109 is displaced by the spring force or elastic restoring force thereof so as to be returned toward the central side of the container 102. When the gravity applied to the weight 110 is reduced to zero gravity, electric current is cut off between the lead wire 112 and the contactor 113, whereupon supply of the conduction signal from the printed circuit board 111 is stopped.

CPU usually monitors the conduction signal from the printed circuit board 111. Upon detection of stop of the conduction signal, CPU supplies an ABNORMAL STATE signal to an inner drive circuit (not shown). The drive circuit is provided for driving a disk head of an internal hard disk, for example. Upon detection of the ABNORMAL STATE signal, the drive circuit moves the disk head to a retreat position, thereby interrupting reading data and program from the hard disk or writing data and program into the hard disk. Thus, an evasive process is carried out to render the possibility of damage to the data or disk head minimum.

The following effect can be achieved from the above-described free fall sensor 101. Firstly, the weight 110 is formed into an oblong cylindrical shape and has the length set to a value substantially twice as large as the diameter thereof or above. Accordingly, even when the diameter of the weight 110 is reduced, necessary mass can be ensured. Moreover, since the weight 110 is connected to the coil spring 109 in the direction of the length of the latter, the free fall sensor can be set at a minimum thickness in the aforementioned electrode arrangement. Further, the container 102 of the free fall sensor 101 has a cylindrical shape and the movable electrode 105 comprising the coil spring 109 and weight 110 also has a circular shape. Accordingly, the free fall sensor can be disposed freely. Moreover, the seat plate 108, coil spring 109 and weight 110 are sequentially connected to the conductive pin 104 so as to confront one another each in the circular shape. As a result, these components can be assembled easily without any directional limitation and the aforementioned arrangement is effective in improving the designing and manufacturing efficiencies.

Figure 14A:
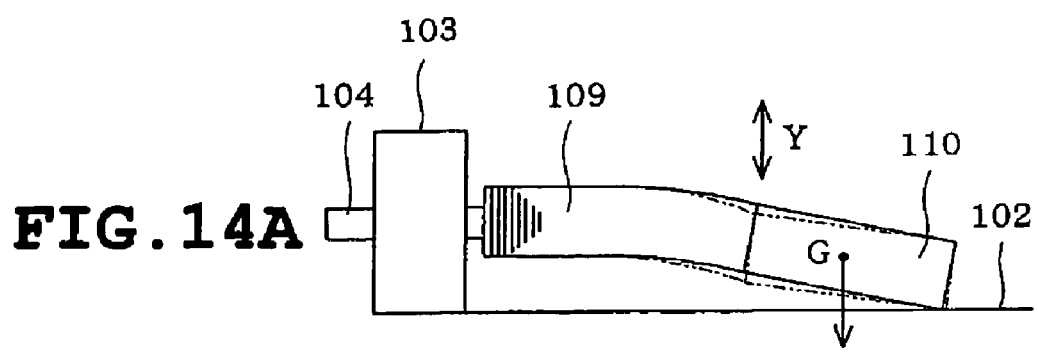
FIGS. 14A to 14C are schematic views of the free fall sensor in different states.
Figure 14B:
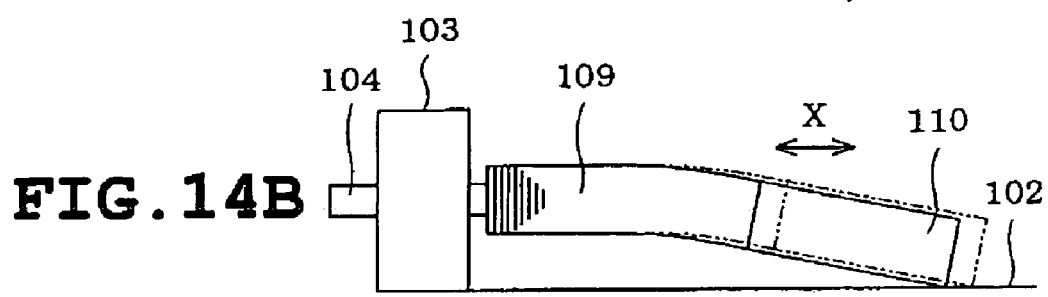
Figure 14C:
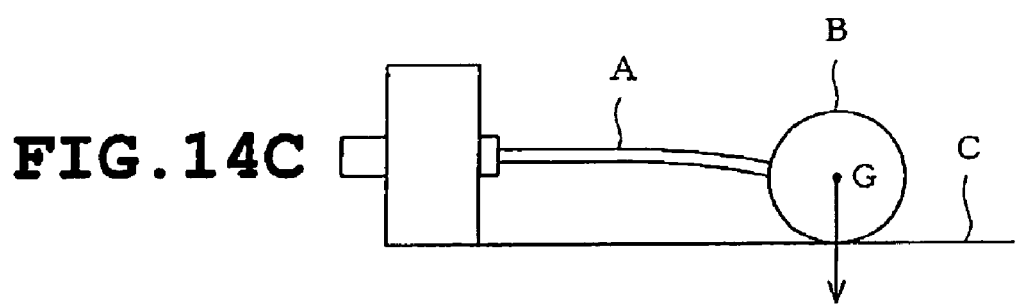

The operations as shown in FIGS. 14A to 14C will be described. FIGS. 14A and 14B show the embodiment of the invention, whereas FIG. 14C shows a prior art construction. Firstly, as shown in FIG. 14A, the oblong weight 110 constitutes a distal end of the coil spring. The center of gravity G is spaced away from a point of contact with the container 102. The other end of the weight 110 is fixed to the coil spring 109. Accordingly, the weight 110 vibrates up and down in the direction of arrow Y in FIG. 14A as the result of vertical elastic deformation of the coil spring 109 when suddenly colliding against the container 102, whereupon the shock can be received by the weight 110. Thus, a shock damping effect by the damping action can be achieved. Moreover, since the distal end of the weight 110 is kept in contact with the inner face of the container 102, frequent bound (repeated collision) can be prevented.

Further, the bending stress or the like is apt to be concentrated in the vicinity of a connection base between the coil spring 109 and the cantilevered conductive pin 104 and in the vicinity of the connection base between the coil spring 109 and the weight 110, whereupon there is a possibility of deformation due to buckling. On the other hand, in the embodiment, the closely wound portion 109b of the coil spring 109 is provided on the connection base. Accordingly, the flexibility is maintained even when a large vibration occurs in the vicinity of the connection base, and the gravitational force of the weight and the bending stress in the occurrence of shock due to the falling can be diffused by the closely wound portion. As a result, the possibility of buckling deformation can be prevented. This results in a reduction in the diameter of the coil spring 109. Thus, the spring force can be reduced and the size of the weight can also be reduced. Consequently, the movable electrode 105 and accordingly, the free fall sensor 101 can be thinned.

Further, referring to FIG. 14B, the airtight container 102 is filled with nitrogen gas. However, the inner face of the container 102 and the electrode surface of the weight 110 are sometimes oxidated or soiled as the result of a long time of service, whereupon there is a possibility that a stable conduction may not be achieved. In the embodiment, however, every time the weight 110 collides with the container 102, an elastic expansion and contraction action in the direction of elongation (shown by arrow X in FIG. 14B) as a characteristic of the coil spring 109 is achieved as well as the aforementioned damping action. Consequently, a wiping effect is obtained that the weight 110 slides right and left when subjected to vibration or shock due to the falling. Soil and an oxide film on the contact face can be removed by the wiping effect. Accordingly, the switching operation stable for a long period of time can be realized even when the contact pressure of the electrode tends to be reduced as the result of miniaturization of the free fall sensor.

In the prior art construction as shown in FIG. 14C, a cantilevered bar-shaped spring A is provided with a weight B of steel ball. The weight B is brought into contact with a container C at a point below the center of gravity G of the weight. Accordingly, the single spring A is liable to be deformed due to buckling as described above. Moreover, this tendency is more conspicuous as the spring force is rendered small by reduction in the diameter of the bar-shaped spring. Thus, the prior art construction is unsuitable for reducing the spring force. As a result, the weight B is restricted by miniaturization of the free fall sensor. Moreover, since the weight B is brought into contact with the container C at the point below the center of gravity G of the weight, there is a possibility that a stable conductive state may not be obtained when the contact faces are soiled or oxidated by a long time of service. Thus, the prior art construction is disadvantageous for further size reduction.

Further, in the embodiment, the coil spring 109 is connected via the spring seat plate 108 to the conductive pin 104 when cantilevered so as to be disposed in the form of a beam. In this case, it is desirable that the conductive pin 104, spring seat plate 108 and coil spring 109 should be connected linearly on a horizontal central axis. In particular, the coil spring 109 is flexible and accordingly, it is not always easy to align the coil spring 109 on a central axis. However, a gap between the coil spring 109 and the container 102 is reduced as the free fall sensor becomes thinner or smaller in size. Accordingly, a high assembly accuracy and strict dimensional control are required in order that a stable switching operation may be achieved.

Means will be described for adjusting so that the movable electrode 105 is linearly connected on the central axis with reference to FIGS. 15A to 15D. FIGS. 5A to 5D show an assembly comprising the conductive pin 104 airtightly inserted through the closing member 103, the spring seat plate 108, the coil spring 109 and weight 110. The assembly is to be force fitted into the container 102. FIGS. 15A and 15C show the assembly prior to adjustment, whereas FIGS. 5B and 5D show the assembly after adjustment. FIG. 15A shows the assembly disposed vertically in the natural state, whereas FIG. 15C is a view as seen from the free end side of the coil spring 109 or in the direction of arrow B. FIG. 15B shows the assembly disposed vertically in the natural state, whereas FIG. 15D is a view as seen from the free end side of the coil spring 109 or in the direction of arrow A. When the central axis (shown by central line R0) of the assembly is inclined slightly rightward at this assembly stage as shown by symbol R1 in FIGS. 15A and 15C, the circular outer-diameter portion of the weight 110 is eccentric. Accordingly, in what direction the weight 110 is inclined can be visually confirmed readily. Then, as shown in FIG. 15B, a suitable portion of the spring seat plate 108 is held by tweezers, for example, and is flexed slightly in the direction of arrow C or B so that the inclination is corrected. It is then confirmed that the weight 110 has been adjusted to a central position as shown in FIG. 15D. As a result, the coil spring 109 can be disposed about the central axis, that is, the movable electrode 105 can be disposed about the central axis. Although the spring seat plate 108 is welded to the conductive pin 104 as described above, the coil spring 109 is fitted with the spring seat plate 108 thereby to be fixed, a slight angular displacement of the spring seat plate 108 can realize the aforesaid adjustment of central axis.

The assembly adjusted as described above is force-fitted into the container 2 so that the free fall sensor is finally completed. The free fall sensor 101 of the embodiment can be thickened to about 1 mm or below 1 mm and can be practically usable although the thickness of the conventional free fall sensor is has been reduced to about 5 mm at the smallest. This corresponds to an outer diameter of the container 102. An experiment was conducted to confirm operability of the assembly with the following component specifications, and the assembly was found to be realizable.

Component specifications of free fall sensor Coil spring 109: compression coil spring (made of copper)
Length: 1.7 to 3.0 mm
Outer diameter: 0.4 to 0.8 mm
Wire size: 30 μm Weight 110: Circular column (made of copper)
Length: 1.5 to 2.5 mm
Diameter: 0.6 to 1.0 mm The following effects can be achieved from the foregoing embodiment. Since the container 102 serving as the fixed electrode, the coil spring 109 serving as the movable electrode 105 and the like are each formed into a circular shape, the free fall sensor can readily be incorporated into the equipment such as a portable computer without limitation of a mounting angle. The free fall sensor thus produced can detect the falling state of the equipment by a normal switching operation, so that a quick countermeasure can be taken.

Furthermore, the following are particularly eminent characteristics of the free fall sensor of the embodiment. Firstly, since the weight 110 is oblong, necessary mass can be achieved even though the weight has a reduced diameter. Moreover, since the weight 110 is connected in the direction of elongation of the coil spring 109, the weight 110 can be set at a minimum thickness, thereby contributing to further reduction in the thickness of the sensor.

Additionally, the movable electrode 105 comprises the coil spring 109 and the oblong weight 110. Accordingly, the damping effect can be expected that the shock can be received to be damped when the weight 110 collides against the container 102, as described with reference to FIG. 14A. Consequently, sound due to the collision of the weight 110 against the container 102 can be reduced, and the weight 110 is retained in the state where the distal end thereof shifted from the center of gravity G is kept in contact with the inner face of the container 102, or even if the weight is bounded, the number of bounding is small and the bounding is restrained to a slight distance. As a result, noise due to collision can effectively be reduced. Further, since almost no contact and separation between the electrodes occur, chattering of the switching function can be prevented. For example, malfunction due to turn-off can be avoided. Additionally, there is a possibility that the sound due to the collision of the weight 110 against the container 102 may become a noise when the portable computer is carried as well as in the falling. Accordingly, the effect by the damping improves the product value.

Bending stress or the like is apt to be concentrated on the vicinity of the junction of the proximal end 109a by the damping action in the falling as well as in the normal stationary state. In the foregoing embodiment, however, the compression coil spring has flexibility and the fixing bases serving as the closely wound portions 109a and 109b are fixed to the conductive pin 104 and the weight 110 respectively. Consequently, the stress can be diffused and the deformation due to buckling can be prevented. Thus, the switching operation between the weight 110 and the container 102 can be maintained in a stable state for a long period of time, whereby the reliability of the sensor can be improved. Further, since the wire diameter of the coil spring 1 can be reduced, the spring force can be reduced and the mass of the weight 110 can be reduced. As a result, further miniaturization of the free fall sensor can be carried out. In this case, since the spring force and the size of the weight 110 can be reduced and the whole sensor can be rendered smaller, noise due to the collision of the weight 110 against the container 102 can also be reduced effectively.

In the foregoing embodiment, the damping effect is obtained from vertical expansion and contraction of the coil spring 109, whereas the wiping effect is obtained from the effective use of the lengthwise expansion and contraction as disclosed with reference to FIG. 14B. More specifically, the weight 110 slides right and left on the inner face of the container 102 while in contact with the latter, whereby soil or oxide film on each contact face is removed. This can provide a stable switching operation for a long period of time and in particular, this can wipe out the possibility of unstable operation due to reduction in the contact pressure between the electrodes for miniaturization of the sensor.

Further, a space around the movable contact 105 in the container 102 is designed to be minimum in order that the free fall sensor 101 may be miniaturized and particularly thinned. For example, when the thickness of the sensor is not more than 1.7 mm, the space becomes several tenths mm wide. Accordingly, the connection of the coil spring 109 and the weight 110 to the conductive pin 104 requires linear connection on a horizontal central axis. Since the coil spring 109 is connected directly to the conductive pin 104, there is no problem. However, the working efficiency is reduced if a high accurate assembling work is required in connection of the coil spring 109. Accordingly, it is desirable to be able to adjust the axis of the coil spring 109 easily after fixation. In the foregoing embodiment, since the spring seat plate 108 is interposed between the conductive pin 104 and the coil spring 109, the axis of the coil spring can be adjusted by a slight displacement of the spring seat plate 108 supporting the coil spring as described above with reference to FIGS. 15A to 15D.

Thus, the coil spring 109 can accurately be disposed as the movable electrode 105. Accordingly, the coil spring 109 can suitably be disposed in a narrow space in the container 102 for the thinning of the sensor. Moreover, the falling state can accurately be detected even when the coil spring 109 is incorporated in every direction. As a result, the possibility of thinning the sensor can be increased and the free fall sensor of the embodiment is effective when the size and weight of the portable computer is further reduced and in particular, when the portable computer is rendered further thinner.

Figure 16A:
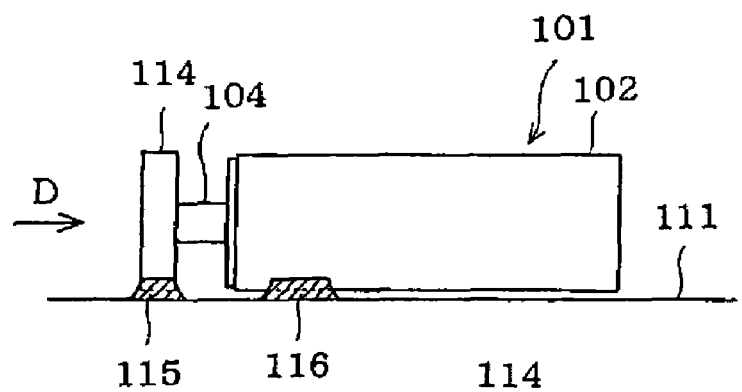
FIGS. 16A and 16B are views of the free fall sensor of a seventh embodiment in accordance with the invention, showing the sensor in an assembling step.
Figure 16B:
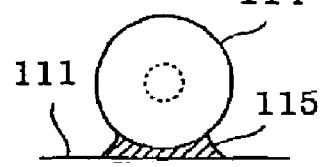
Figure 16C:
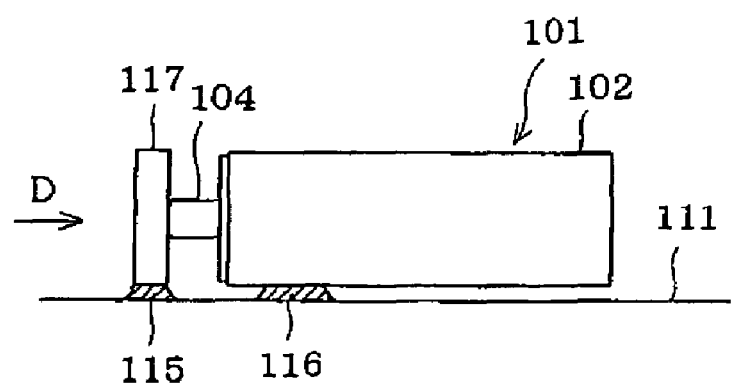
FIGS. 16C and 16D are views of the free fall sensor of an eighth embodiment in accordance with the invention, showing the sensor in an assembling step.
Figure 16D:
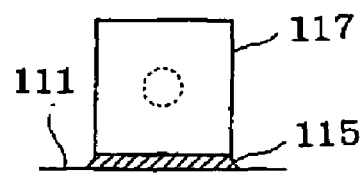

FIGS. 16A to 16D illustrate seventh and eighth embodiments of the invention. Identical or similar parts in the seventh and eighth embodiments are labeled by the same reference symbols as those in the sixth embodiment. The seventh and eighth embodiments relate to improvements in the means for mounting the free fall sensor 101 on the printed circuit board 111. FIGS. 16A and 16B show the seventh embodiment and FIGS. 16C and 16D show the eighth embodiment.

For example, in the seventh embodiment, the free fall sensor 101 is connected via a lead 112 between the conductive pin 104 and the printed board 111 and further connected via a contact 113 to the container 102 and printed board 111. When the sensor is soldered to the printed board 111, a mounting direction is limited.

On the other hand, in each of the seventh and eighth embodiments, the sensor can easily be connected to the printed board 111 without limitation of the mounting direction. Firstly, in the seventh embodiment as shown in FIGS. 16A and 16b, a lead disc 114 made of a metal is welded to an outer end of the conductive pin 104. FIG. 16B is a view as viewed in the direction of arrow D. The lead disc 114 has an outer diameter substantially equal to that of the container 102. The conductive pin 104 is connected to the center of a circular flat face so as to be electrically conductive.

The free fall sensor 101 and the lead plate 114 have substantially the same outer diameter and accordingly, the free fall sensor can be disposed on the printed board 111 without limitation of the mounting direction. As a result, the lead plate 111 and the container 102 serving as the fixed electrode are soldered at solders 115 and 116 to corresponding positions of the conductive pattern (not shown) of the printed board 111, whereupon predetermined electrical paths are formed. Thus, in addition to the construction of the nondirectional free fall sensor, means for electrically connecting the free fall sensor to the printed board 111 is not limited in the directionality. As a result, the assembling efficiency can be improved to a large extent, and the circular lead disc 114 is not limited in the directionality, whereupon the connection to the conductive pin 104 can be easily carried out. In this respect, the free fall sensor can efficiently be assembled.

On the other hand, in the eighth embodiment as shown in FIG. 16B, a metal polygonal or, for example, square lead plate 117 is welded to an outer end of the conductive pin 104. The lead plate 117 has an outer dimension substantially equal to the outer diameter of the container 102. The conductive pin 104 is connected to a central portion of the square lead plate 117. The conductive pin 104 is connected to the center of a circular flat face so as to be electrically conductive.

According to the foregoing construction, the free fall sensor can easily be connected at four points to the printed board 111 although the eighth embodiment does not reach the seventh embodiment in which the directionality of the lead plate 114 has no stages. Consequently, the assembling efficiency substantially the same as in the seventh embodiment can be achieved from the eighth embodiment.

The invention should not be limited to the foregoing embodiments as described with reference to the accompanying drawings. For example, the fixing means provided at both ends of the coil spring and the spring seat plate should not be limited to the above-described dish-shaped one. The spring seat plate may have a shape of sheet to which the end face of the coil spring is adjacent, or another engaging means serving as positioner may be provided. Further, two free fall sensors may be provided so that the falling state in every direction can reliably be detected. Thus, the present invention may be modified without departing from the scope thereof.

Figure 17:
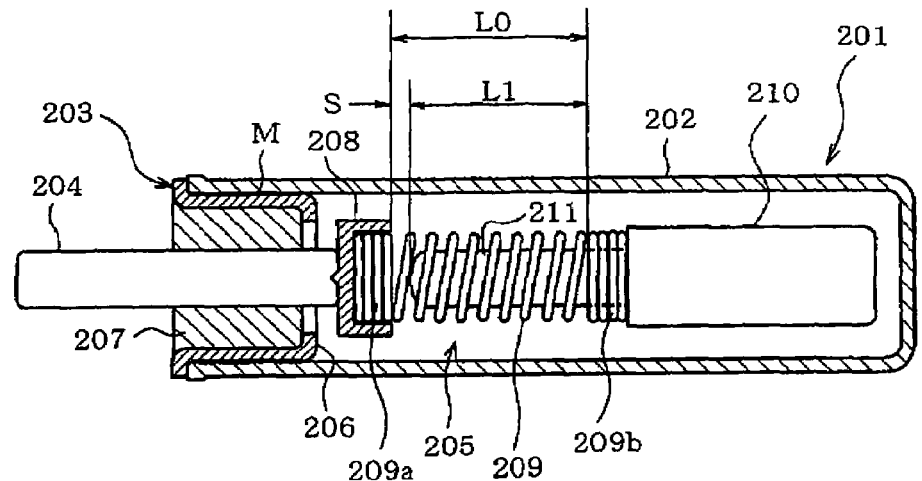
FIG. 17 is a partially broken sectional view of the free fall sensor of a ninth embodiment in accordance with the invention.
Figure 18:
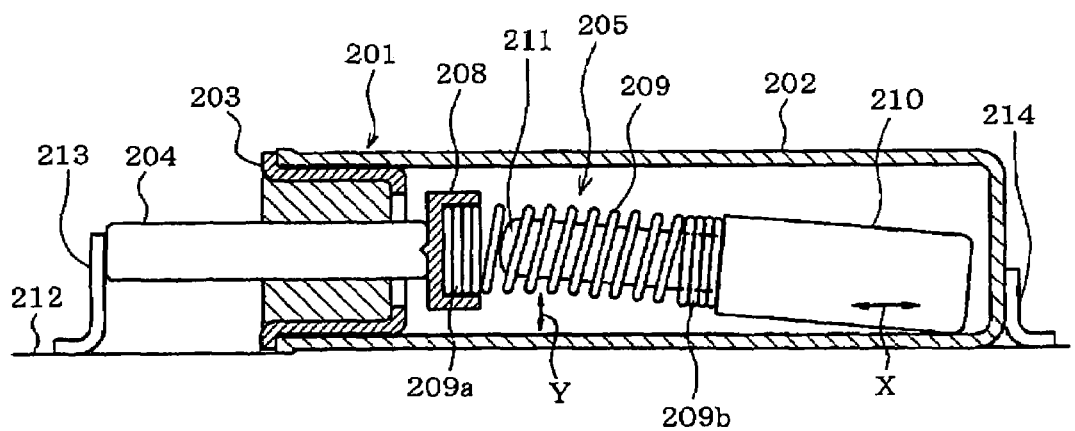
FIG. 18 is a view similar to FIG. 17, showing the free fall sensor in an operating mode.

FIGS. 17 and 18 illustrate a ninth embodiment of the invention. The free fall sensor 201 comprises a slender cylindrical container 202 having an opening at one end, a closing member 203 for closing the opening of the container for electrical insulation and airtightness, a bar-shaped electrically conductive pin 204 extending in an airtight manner through the closing member 203 into the container 202, and a movable electrode 205 connected to an inner end of the conductive pin 204 inside the container 202.

More specifically, the container 202 is made of an electrically conductive metal and has one open end and a closed end. The conductive container 202 serves as a fixed electrode as will be described later. Next, the closing member 203 comprises a cylindrical frame 206 and an electrically conductive filler 207, such as glass, filling the interior of the frame. The conductive pin 204 extends horizontally through a centrally located through hole 203a formed in the bottom of the closing member 203. The frame 206 is force-fitted into the container 202 thereby to be fixed to the latter. In this case, an inner peripheral surface of the container 2 and an outer peripheral surface of the frame 6 are previously electroplated with nickel and gold or gold alloy M. Electroplated layers of the container 2 and frame 6 are integrated together as the result of force-fitting, whereupon the airtightness is improved.

The container 202 is airtightly closed and the conductive pin 204 is electrically insulated from the container 202. With this, the interior of the container 202 is evacuated or filled with an antioxidant gas such as gaseous nitrogen or gaseous helium in order that the inner peripheral surface of the container 202 serving as the fixed electrode may be prevented from oxidation for a long period of time.

The specific construction of the movable electrode 205 will now be described. The movable electrode 205 is disposed in the container 202 closed as described above. The movable electrode 205 is electrically brought into contact with and parted from the container 202 in subjection to fall, shock or the like. The movable electrode 205 comprises a coil spring 209 and a weight 210 both connected via the conductive joint 208 to the inner end of the conductive pin 204 in turn so that the coil spring and weight are electrically conductive. More specifically, the joint 208 is made of a metal and formed into the shape of a circular shallow dish. The central rear of the standing joint 208 is welded to an inner end of the conductive pin 204. The joint 208 may or may not be provided in the embodiment. Accordingly, the coil spring 209 may directly be connected to the conductive pin 204. However, the joint 208 is useful in that the joint makes it easier to connect the coil spring 209 and to adjust for improvement in the assembly accuracy of the movable electrode 205.

The coil spring 209 is connected to a receiving dish-shaped face side of the joint 208 by an electrically conductive bonding agent. The joint 208 has an inner diameter substantially equal to an outer diameter of the coil spring 209 and receives one end of the coil spring 209. The coil spring 209 comprises a compression coil spring made of an electrically conductive metal such as phosphor bronze or the like and formed into a cylindrical shape. The coil spring 9 has an end which is to be fixed to the joint 208 and formed into a force-fit closely wound portion 209a with improved rigidity. As a result, the bonding work can be simplified and the telescopic motion of the closely wound portion 209a is canceled so that the original flexure is not influenced by the application of the bonding agent.

The coil spring 209 is thus cantilevered via the joint 208 on the conductive pin 204 and has the other or free end connected to the weight 210. The free end of the coil spring 209 is also formed with a closely wound portion 209b having a predetermined length. The closely wound portion 209b is fixed to one end of the weight 210 by the conductive bonding agent. The weight 210 is made of an electrically conductive metal such as copper and formed into an oblong columnar shape. The weight 210 has a surface which is silver-plated. The weight 210 has a diameter slightly larger than an outer diameter of the coil spring 209. The weight 210 has one end connected to the coil spring 209 and a core member 211 integrally formed at the one end side. The core member 211 has a diameter smaller than the inner diameter of the coil spring 209 and is formed into a circular cylindrical shape. The core member 211 is loosely inserted into the inner space of the coil spring 209.

The coil spring 209 has an effective length L0 which excludes both closely wound portions 209a and 209b and corresponds to a free wound portion. The core member 211 has a length L1 slightly shorter than the effective length L0 of the coil spring 209 (L0>L1). Accordingly, the coil spring 209 is designed to flex at a stroke S corresponding to a predetermined dimension which is equal at least to the difference between L0 and L1. Further, in the embodiment, the coil spring 209 is capable of flexing until the distal end of the core member 211 reaches the closely wound portion 209a to be blocked by the joint 208. Since the core member 211 is thus set at the length L1 shorter than the effective length L0 of the coil spring 209, an amount of flexure is ensured which is required for the core member 211 to be blocked by the member at the conductive pin side even though the closely wound portion 209a is filled with the bonding agent.

The free fall sensor 201 thus assembled is incorporated in the portable computer (not shown) such as a notebook-sized personal computer in an oblong state as shown in FIG. 18. In this case, the coil spring 209 is cantilevered and the weight 210 is connected to the free end of the coil spring 209. Accordingly, the coil spring 209 is flexed to a larger extend at the weight 210 side such that the weight 210 side of the coil spring is inclined below the horizontal central axis in the container 202. The coil spring 209 is normally maintained in the state where the distal end of the weight 210 is in contact with the inner face of the container 202 as shown in FIG. 18. In this case, the core member 211 is loosely inserted in the inner space of the coil spring 209 so that the coil spring 209 is allowed to flex.

The free fall sensor 201 having the above-described construction is disposed on a conductive pattern (not shown) of a printed circuit board 212 of the equipment. A lead wire 213 is soldered to an outer end of the conductive pin 204 located outside the container 202, for example. An L-shaped metal contact 214 is welded to the underside of the container 202, whereupon an electrical path is formed so as to be conductive to the printed circuit board 212.

Accordingly, the electrical path is normally formed as the result of contact between the weight 210 and the container 202. The coil spring 209 and weight 210 both connected to the conductive pin 204 constitute a movable electrode 205, whereas the container 202 serves as a fixed electrode, whereupon the coil spring 209, weight 210 and container 202 constitute a switching mechanism. The aforesaid printed circuit board 212 is fixed inside the portable computer and connected to CPU (not shown). A conduction signal is supplied from the printed circuit board 212 to CPU when a section between the lead wire 213 and the contact 214 is electrically conductive.

The operation of the free fall sensor will now be described. In a stationary or normal state, the central axis is substantially horizontal as shown in FIG. 18, and the gravity of the weight 210 elastically flexes the cantilevered beam-like coil spring 209 such that the free end of the coil spring is in contact with the inner surface of the container 202. Consequently, electric current flows through the lead wire 213, conductive pin 204, movable electrode 205 (coil spring 209 and weight 210), container 202 serving as the fixed electrode, and the contact 214. Thus, the free fall sensor 201 serves as a normally closed switch. An electrical path to the printed circuit board 212 is thus formed, whereby the conduction signal is supplied to CPU.

On the other hand, a case where the portable computer has fallen will now be described. The gravity applied to the weight 210 is apparently reduced when the portable computer is in the falling state. Accordingly, the coil spring 209 is displaced by the spring force or elastic restoring force thereof so as to be returned toward the central side of the container 202, whereupon the coil spring 209 is parted from the container 202. When the gravity applied to the weight 210 is reduced to a predetermined value, the distal end of weight 210 at the free end side is completely parted from the inner face of the container 202 as shown in FIG. 17, whereupon electric current is cut off between the lead wire 213 and the contact 214, whereupon supply of the conduction signal from the printed circuit board 212 is stopped.

CPU usually monitors the conduction signal from the printed circuit board 212. Upon detection of stop of the conduction signal, CPU supplies an ABNORMAL STATE signal to an inner drive circuit (not shown). The drive circuit is provided for driving a disk head of an internal hard disk, for example. Upon detection of the ABNORMAL STATE signal, the drive circuit moves the disk head to a retreat position, thereby interrupting reading data and program from the hard disk or writing data and program into the hard disk. Thus, an evasive process is carried out to render the possibility of damage to the data or disk head minimum.

The free fall sensor 201 undergoes large shock or rebound when fallen onto a floor, for example. In particular, the weight 210 connected to the coil spring 209 is movable in the compressing direction of the coil spring although the interior of the container 202 is narrow. Accordingly, there is conventionally a possibility that a part of the coil spring 209 may be plastically deformed when the coil spring 209 undergoes sudden compression resulting in total contraction.

On the other hand, in the embodiment, the core member 211 with the smaller diameter is loosely inserted in the inner space of the coil spring 209, and the length L1 of the core member 211 is set to be shorter than the effective length L0 of the coil spring 209 (L0>L1). The core member 211 is incorporated so as to be displaceable by compression at least a predetermined dimension S until the distal end of the core member is blocked by the joint 8 as the member at the conductive pin 204 side in order that minimum expansion and contraction may be ensured. Accordingly, when the sensor undergoes relatively small shock, the weight 210 is parted from the container 202 by the elastic deformation of the coil spring 209 with the effective length L0, the supply of the conduction signal is stopped. Further, the aforementioned evasive process is carried out. Thus, a large flexure causing plastic deformation of the coil spring 209 can be coped with without function of the core member 211. On the other hand, upon occurrence of large shock, the core member 211 is moved a distance corresponding to the dimension S and thereafter, blocked by the member of the conductive pin 204 side. As a result, the movement of the weight 210 is prevented such that large flexure of the coil spring 209 can be restrained, whereby the coil spring 209 is prevented from plastic deformation. In this case, since the weight 210 is limited to a slight displacement, sound due to collision against the container 202 and rebound can also be reduced. Thus, the core member 211 limits an amount of displacement of the coil spring 209 in the compressing direction to a predetermined range, thereby serving as displacement limiting means for limiting displacement of the coil spring 209.

Further, the oblong weight 210 is brought into contact with the container 202 at the distal end thereof spaced from the center of gravity. Accordingly, the cantilevered coil spring 209 undergoes vertical elastic deformation by vibration, thereby vibrating vertically within a range of space where it radially abuts against the core member 211, as shown by arrow Y in FIG. 18. As a result, the vibration is received so as to be damped, whereby a shock damping effect due to the damping action can be obtained. In this case, the contact between the distal end of the weight 210 and the container 202 is maintained, so that at least frequent bounding (chattering) is reduced to a large extent.

Additionally, in the embodiment, the airtight container 202 is filled with nitrogen gas. However, the inner face of the container 202 and the electrode surface of the weight 210 are sometimes oxidated or soiled as the result of a long time of service, whereupon there is a possibility that a stable conduction may not be achieved. In the embodiment, however, every time the weight 210 collides with the container 202, an elastic expansion and contraction action in the direction of elongation (shown by arrow X in FIG. 18) as a characteristic of the coil spring 209 is achieved as well as the aforementioned damping action. Consequently, a wiping effect is obtained that the weight 210 slides right and left when subjected to vibration or shock due to the falling. Soil and an oxide film on the contact face can be removed by the wiping effect. Accordingly, the switching operation stable for a long period of time can be realized even when the contact pressure of the electrode tends to be reduced as the result of miniaturization of the free fall sensor.

The closely wound portions 209a and 209b of the coil spring 209 is effective in rendering the connecting work easier when the joint 208 and weight 210 are connected to the coil spring by the bonding agent, as described above. Further, the bending stress or the like is apt to be concentrated in the boundary between these connection bases and the vibrating portions, whereupon there is a possibility of plastic deformation. On the other hand, in the embodiment, the closely wound portions 209a and 209b of the coil spring 209 are provided on the connection base. Accordingly, the flexibility is maintained even when a large vibration occurs in the vicinity of the connection bases, and the gravitational force of the weight and the bending stress in the occurrence of shock due to the falling can be diffused by the closely wound portion. As a result, the possibility of buckling and plastic deformation can be prevented. This results in a reduction in the diameter of the coil spring 209. Thus, the spring force can be reduced and the size of the weight can also be reduced. Consequently, the movable electrode 205 and accordingly, the free fall sensor 201 can be thinned.

Further, in the embodiment, the coil spring 209 is connected via the circular dish-shaped joint 208 to the conductive pin 204 when cantilevered so as to be disposed in the form of a beam. In this case, it is desirable that the conductive pin 204, coil spring 209 and weight 210 should be connected linearly on a horizontal central axis. In particular, the coil spring 209 is flexible and accordingly, it is not always easy to align the coil spring 209 on a central axis. However, a gap between the coil spring 209 and the container 202 is reduced as the free fall sensor becomes thinner or smaller in size. Accordingly, a high assembly accuracy and strict dimensional control are required in order that a stable switching operation may be achieved.

The joint 208 is effective in the point that it renders the connecting work easy when the conductive pin 204 and coil spring 209 are connected together although the joint is not an essential component in the movable electrode 205. In particular, when the assembly is slightly inclined relative to the central axis in assembly of the movable electrode 205, the joint 208 is held by tweezers and slightly flexed in the direction opposite the inclination so that the assembly is corrected, whereby the inclination is adjusted and corrected. Consequently, the coil spring 209 and weight 210 or the movable electrode 205 can be aligned along the proper axis. The joint is thus useful as an assembly adjusting member.

Further, according to the embodiment, the weight 210 is formed into the shape of an oblong circular column and connected to the free end of the coil spring 209. Consequently, necessary gravity can be ensured easily while the diameter of the weight is reduced. Further, the thickness of the electrode structure can also be reduced. Further, since the container 202 is also formed into the cylindrical shape, it can be disposed in every direction together with the movable electrode comprising the coil spring 209, weight 210 and the like. Moreover, the joint 208, coil spring 209 and weight 210 are sequentially connected to the conductive pin 204 so as to confront one another each in the circular shape. As a result, these components can be assembled easily without any directional limitation and the aforementioned arrangement is effective in improving the designing and manufacturing efficiencies.

The following effects can be achieved from the foregoing embodiment. Since the container 202 serving as the fixed electrode, the coil spring 209 and the weight 210 both serving as the movable electrode 105 and the like are each formed into a circular shape, the free fall sensor can readily be incorporated into the equipment such as a portable computer without limitation of a mounting angle. The free fall sensor thus produced can detect the falling state of the equipment by a normal switching operation, so that a quick countermeasure can be taken.

In particular, in order that the aforementioned performance may be maintained for a long time, the embodiment employs means for protecting the coil spring 209 against the shock due to the falling or the like. In order that the coil spring 209 may be restrained from being forced to undergo via the weight 210 large flexure in the compressing direction. The displacement limiting means is provided for limiting an amount of displacement of the coil spring 209 within a predetermined range. More specifically, the circularly cylindrical core member 211 which protrudes integrally from the weight 210 side is loosely inserted in the inner space of the coil spring 209. The core member 211 has the length L1 shorter than the effective length L0 of the coil spring 209 so as to allow necessary flexure of the coil spring and limits large flexure (L0>L1).

Consequently, an excessive flexure of the coil spring 209 in the compressing direction is limited to an amount of displacement corresponding to the predetermined dimension S when the core member 211 is blocked by the joint 208 which is a member at the conductive pin 204 side. Accordingly, the coil spring 209 can be used without buckling and plastic deformation and predetermined quality and function can be maintained for a long period of time. Thus, the free fall sensor 201 having an eminent durability can be provided. Further, since a large variation in the weight 210 and particularly degree of collision against the container 2 are reduced, sound due to collision or vibration can also be restrained.

Thus, the free fall sensor 201 is superior in the original functions and has the following eminent characteristics. Firstly, since the weight 210 is oblong, a required weight can be set and ensured even when the diameter of the weight is reduced. Further, since the weight is connected in the direction of elongation of the coil spring 209, the electrode structure can be set at a minimum thickness and miniaturization suitable for thin type of sensors can be achieved. Additionally, the movable contact comprises the coil spring 209 and the oblong weight 210. As a result, when the weight 210 collides against the container 202, the damping effect that the shock is received so as to be damped can be expected, whereupon sound due to the collision of the weight 210 against the container 202 can be reduced. With this, the weight 210 can be maintained in the state where the distal end thereof is in contact with the inner face of the container 202 and the number of bound can be rendered minimum and a bounding distance can be rendered small even if the weight bounds. Consequently, noise due to the collision can effectively be reduced.

Consequently, the chattering of the switching function due to repeated contact and separation of the electrodes can be reduced and accordingly, the possibility of malfunction resulting from turn-off of the free fall sensor can be avoided, for example. Additionally, there is a possibility that the sound due to the collision of the weight 210 against the container 202 may become a noise when the portable computer is carried as well as in the falling. Accordingly, the effect by the damping improves the product value.

The damping effect is obtained from vertical expansion and contraction of the coil spring 209, whereas the wiping effect is obtained from the effective use of the lengthwise expansion and contraction. More specifically, the weight 210 slides right and left on the inner face of the container 202 while in contact with the latter, whereby soil or oxide film on each contact face is removed. This can provide a stable switching operation for a long period of time and in particular, this can wipe out the possibility of unstable operation due to reduction in the contact pressure between the electrodes for miniaturization of the sensor.

The core member 211 is formed integrally with the weight 210 in the embodiment. However, for example, the core member as a discrete member may be welded or bonded, instead. Further, the material for the core member should not be limited to the metal but it may be made of plastics or rubber. The location of the core member should not be limited to the weight 210 side. Modified forms of the displacement limiting means (tenth and eleventh embodiments) will be described with reference to FIGS. 19 and 20 respectively. Identical or similar parts are labeled by the same reference symbols as those in the ninth embodiment and will not be described. Only the difference will be described.

Figure 19:
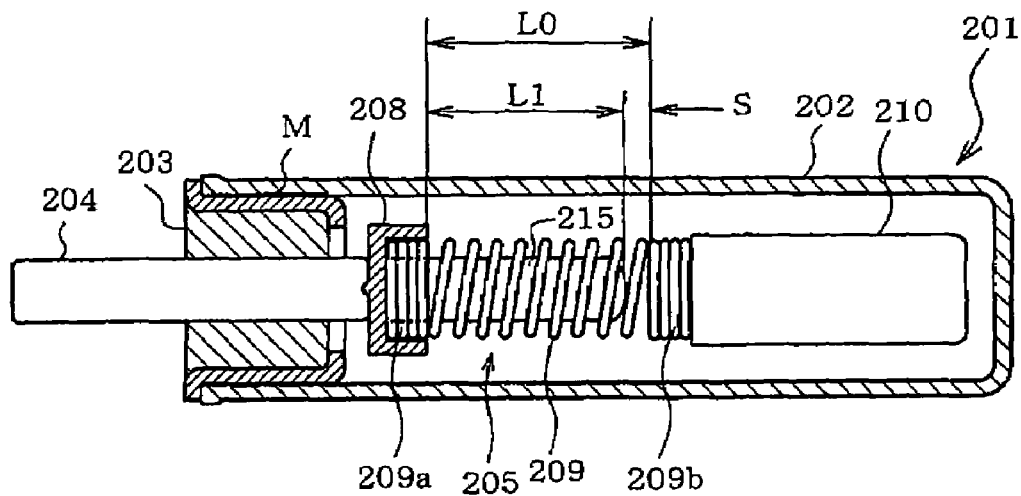
FIG. 19 is a view similar to FIG. 17, showing the free fall sensor of a tenth embodiment in accordance with the invention.

Firstly, the tenth embodiment will be described with reference to FIG. 19 (corresponding to FIG. 17). In the free fall sensor 201 of the tenth embodiment, the core member 215 serving as the displacement limiting means for the coil spring 209 is caused to protrude from the joint 208 which is a member at the conductive pin 204 side and is loosely inserted in the inner space of the coil spring 209. The core member 215 is welded or bonded to the joint 208. The other construction of the free fall sensor of the tenth embodiment is substantially the same as that of the ninth embodiment.

In the above-described construction, when the free fall sensor is subjected to shock due to the falling or the like, the weight 210 moves while compressing the coil spring 209, being blocked by the distal end of the core member 215. As a result, since the coil spring 209 is protected without receiving excessive pressure from the weight 210, the plastic deformation with large flexure can be prevented. Accordingly, the same effect as achieved from the ninth embodiment can also be achieved from the tenth embodiment with the original functions of the free fall sensor 201.

Figure 20:
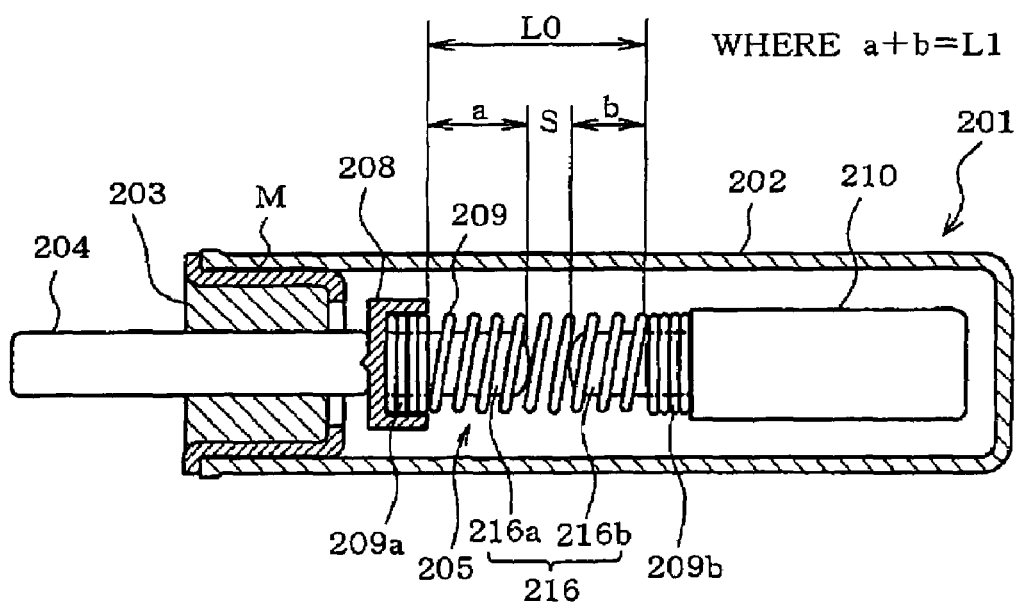
FIG. 20 is a view similar to FIG. 17, showing the free fall sensor of an eleventh embodiment in accordance with the invention.

FIG. 20 illustrates an eleventh embodiment and corresponds to FIG. 1. In the eleventh embodiment, the core members 216 protrude oppositely from the weight 210 and the joint 208 respectively. Accordingly, the core members 216 comprise first and second cores 216a and 216b respectively. An addition L1 of the lengths a and b of the core members 216 is set to be slightly shorter than the effective length L0 of the coil spring 209 (L0>a+b=L1) The other construction of the free fall sensor of the eleventh embodiment is substantially the same as that of the ninth embodiment.

Consequently, the core member 216 having the length L1 shorter than the effective length L0 of the coil spring 209 is constructed. As in the above-described tenth embodiment, the second core 216b at the weight 210 side is blocked by the first core 216a at the joint 208 side, whereby the displacement of the coil spring 209 is limited in subjection to shock. Accordingly, large flexure is prevented such that the coil spring can be prevented from plastic deformation or the like.

Figure 21:
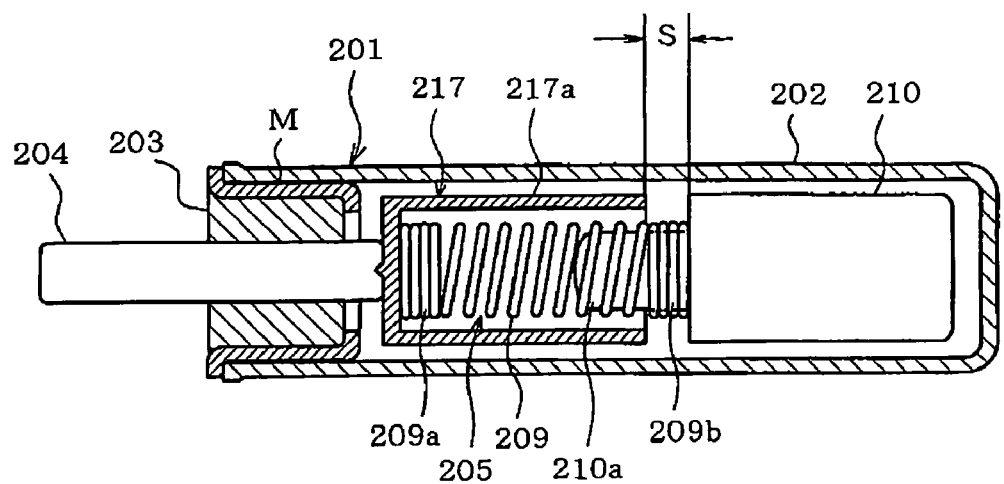
FIG. 21 is a view similar to FIG. 17, showing the free fall sensor of a twelfth embodiment in accordance with the invention.
Figure 22:
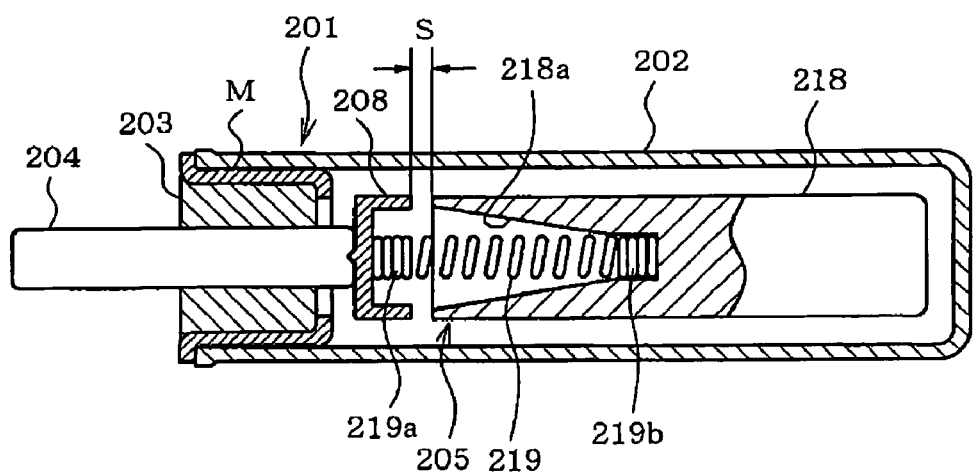
FIG. 22 is a view similar to FIG. 17, showing the free fall sensor of a thirteenth embodiment in accordance with the invention.
Figure 23:
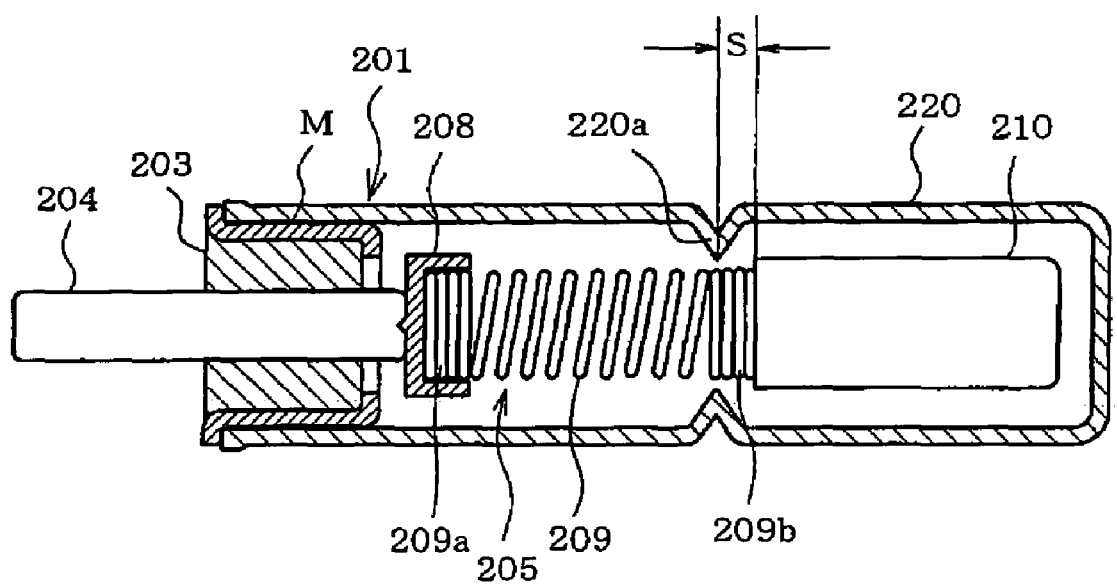
FIG. 23 is a view similar to FIG. 17, showing the free fall sensor of a fourteenth embodiment in accordance with the invention.

FIGS. 21 to 23 illustrate twelfth to fourteenth embodiments of the invention. These embodiments relate to the displacement limiting means for the coil spring 209. Identical or similar parts are labeled by the same reference symbols as those in the ninth embodiment and will not be described. Only the difference will be described.

FIG. 21 illustrates the twelfth embodiment and corresponds to FIG. 1. In the twelfth embodiment, the displacement limiting means blocks the movement of the weight 210 by making use of the joint 217. More specifically, the joint 217 is formed into a bottomed cylindrical shape. The joint 217 includes a cylindrical portion 217a into which the coil spring 209 is loosely inserted (large diameter).

The weight 210 has such a diameter as to be blocked by the distal end of the cylindrical portion 217a. The weight 210 confronts the cylindrical portion 217a with a predetermined distance S defined therebetween when in the stationary or free state. Accordingly, the coil spring 209 is covered by the joint 217 except for a part corresponding to the distance S. A protrusion 210a protrudes integrally from a connected portion of the coil spring 209 at the weight 210 side. The protrusion 210a serves as a joint effectively rendering the fitting of the closely wound portion 209b easier and supporting the closely wound portion in order that the coil spring 209 may easily be connected by the bonding agent.

According to the above-described embodiment, since a displacement amount of the coil spring 209 in the compression direction is set at the predetermined distance S, the joint 217 and the weight 210 are moved by the distance S upon receipt of shock due to the falling and thereafter, the weight 210 is blocked by the joint 217, whereupon further flexure is prevented and plastic deformation is avoided. Accordingly, since the coil spring 209 can be protected against the plastic deformation for a long period of time, the free fall sensor 201 with high durability can be provided as in the foregoing embodiments.

FIG. 22 illustrates a thirteenth embodiment of the invention. In the thirteenth embodiment, the joint 208 and the weight 218 confront each other with the distance S defined therebetween as in the twelfth embodiment. Upon subjection to shock, the weight 218 is blocked by the joint 208 such that the coil spring 219 is prevented from displacement over the distance S.

The coil spring 219 has a smaller diameter in order to be disposed inside the weight 218 as will be described later. The closely wound portions 219a and 219b on both ends of the coil spring 219 are connected to the joint 208 and the weight by the bonding agent respectively.

The joint 208 to which the closely wound portion 219a is bonded is the same as used in the first embodiment. The weight 218 has a conical recess 218a formed in the end thereof to which the closely wound portion 219b is bonded. A large part of the coil spring 219 is enclosed in the recess 218a. Moreover, the weight 218 has an outer diameter substantially equal to the outer diameter of the joint 208. In short, the dish-shaped end of the joint 208 confronts an outer peripheral end of the weight 218 at the recess 218a side and the distance S is defined therebetween when in the stationary or free state. The coil spring 219 has such a diameter as to be loosely inserted in the recess 218a (small diameter).

In the thirteenth embodiment, too, the joint 218 is utilized as the means for limiting the displacement amount of the coil spring 209 in the compression direction to the distance S. Consequently, the thirteenth embodiment can achieve the same effect as the twelfth embodiment. The recess 218a should not be limited to the conical shape but may be cylindrical with a larger inner diameter. In this case, the diameter of the coil spring 219 is increased.

FIG. 23 illustrates a fourteenth embodiment of the invention and corresponds to FIG. 17. The movable contact 205 in the fourteenth embodiment has substantially the same construction as that in the ninth embodiment. On the other hand, the container 220 includes a reduced-diameter portion 220a which is formed in the middle thereof so as to protrude inward. The reduced-diameter portion 220a has an annular constricted shape. More specifically, the left end of the weight 210 is caused to abut directly against the reduced-diameter portion 220a. Further, the reduced-diameter portion 220a is located so as to be spaced away from the left end of the weight 210 with the predetermined distance S defined therebetween.

According to the above-described construction, when the weight 210 moves in the compression direction of the coil spring 209 upon subjection to shock due to the falling or the like, the left end of the weight 210 abuts against the reduced-diameter portion 220a such that further movement of the weight 210 is blocked. More specifically, the coil spring 209 is allowed to deform by compression by an amount corresponding to the distance S but prevented from large flexure resulting in the plastic deformation. Accordingly, the reduced-diameter portion 220a limits the movement of the weight 210 and consequently serves as displacement limiting means for limiting displacement of the coil spring 209. Thus, the free fall sensor 201 with high durability and stable performance can be provided. The reduced-diameter portion 220a is provided for blocking the weight 210 and accordingly should not be limited to the annular continuous shape. The reduced-diameter portion may protrude inward discontinuously or partially. In this case, too, the same effect as described above can be achieved.

Each of the container and the coil spring should not be limited to the cylindrical shape. For example, when the core member is not inserted in the inner space of the coil spring, the coil spring may be conical or have the shape of a hand drum. Furthermore, when the weight is directly blocked, a partial protrusion corresponding to the large diameter portion may be formed.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A free fall sensor comprising:
an electrically conductive container;
an electrically conductive pin having an end inserted into the container; and
a movable electrode provided in the container, the movable electrode including a coil spring cantilevered on the end of the conductive pin and a weight provided in an inner space of the coil spring so as to be movable and so as to be prevented from falling off, wherein the weight is a sphere having a smaller diameter than the coil spring.

2. A free fall sensor comprising:
an electrically conductive container;
an electrically conductive pin having an end inserted into the container; and
a movable electrode provided in the container, the movable electrode including a coil spring cantilevered on the end of the conductive pin and a weight provided in an inner space of the coil spring so as to be movable and so as to be prevented from falling off, wherein the weight comprises a plurality of spheres.

3. A free fall sensor comprising:
an electrically conductive container;
an electrically conductive pin having an end inserted into the container; and
a movable electrode provided in the container, the movable electrode including a coil spring cantilevered on the end of the conductive pin, the coil spring having a free end, a sphere provided in an inner space of the coil spring so as to be movable and so as to be prevented from falling off and a weight provided on the free end of the coil spring.

4. The free fall sensor according to claim 3, wherein the weight serves as a fall-off preventing member preventing the sphere from falling off.

5. The free fall sensor according to claim 3, wherein a plurality of the spheres are provided.

6. The free fall sensor according to claim 3, wherein the sphere has a smaller free length than the coil spring.

7. A free fall sensor comprising:
an electrically conductive container;
an electrically conductive pin having an end inserted into the container; and
a movable electrode provided in the container, the movable electrode including a spring seat fixed to the end of the conductive pin, a coil spring having an end fixed to the spring seat and having a free end and a weight provided on the free end of the coil spring, the spring seat being formed into a shape of a shallow dish and having an inner diameter substantially as large as an outer diameter of the coil spring so that the coil spring is received by the spring seat.

8. The free fall sensor according to claim 7, wherein the weight extends lengthwise from the free end of the coil spring and has a larger length than a diameter thereof and formed into an oblong cylindrical shape.

9. The free fall sensor according to claim 8, wherein the coil spring includes a fixed proximal end having coil turns closer than the other part thereof.

10. A free fall sensor comprising:
an electrically conductive container;
an electrically conductive pin having an end inserted into the container; and
a movable electrode provided in the container, the movable electrode including a coil spring fixed to the end of the conductive pin and having a free end and a weight provided on the free end of the coil spring, the coil spring being provided with a displacement limiter for limiting an amount of displacement of the coil spring in a direction of compression to a predetermined range, wherein
the displacement limiter limits movement of the coil spring by the weight in the direction of compression to a predetermined range; and
the coil spring includes a core loosely inserted in an inner space of the coil spring and having a shorter circularly cylindrical shape than an effective length of the coil spring, and the core collides with a conductive-pin-side member at a predetermined position, thereby limiting the movement of the weight.

11. The free fall sensor according to claim 10, wherein the core is fixed to either one or both of the conductive pin and the weight.

12. A free fall sensor comprising:
an electrically conductive container;
an electrically conductive pin having an end inserted into the container;
a movable electrode provided in the container, the movable electrode including a coil spring fixed to the end of the conductive pin and having a free end and a weight provided on the free end of the coil spring, the coil spring being provided with a displacement limiter for limiting an amount of displacement of the coil spring in a direction of compression to a predetermined range; and
a member provided at the conductive pin side, wherein the weight collides with the member at a predetermined position around the coil spring, whereupon the movement of the weight is limited.

13. A free fall sensor comprising:
an electrically conductive container;
an electrically conductive pin having an end inserted into the container;
a movable electrode provided in the container, the movable electrode including a coil spring fixed to the end of the conductive pin and having a free end and a weight provided on the free end of the coil spring, the coil spring being provided with a displacement limiter for limiting an amount of displacement of the coil spring in a direction of compression to a predetermined range; and
a protrusion provided in the container, wherein the weight collides against the protrusion at a predetermined position, whereupon the movement of the weight is limited.

* * * * *